United States Patent [19]
Morita et al.

[11] Patent Number: 6,056,843
[45] Date of Patent: May 2, 2000

[54] SHEET LAMINATION MODELING METHOD AND SHEET LAMINATION MODELING APPARATUS

[75] Inventors: Satoshi Morita, Nishio; Kazuo Sugiyama, Aichi-ken, both of Japan

[73] Assignee: Kira Corporation, Aichi-Ken, Japan

[21] Appl. No.: 09/041,634

[22] Filed: Mar. 13, 1998

Related U.S. Application Data

[63] Continuation of application No. 08/663,081, Jun. 25, 1996, abandoned.

[30] Foreign Application Priority Data

Dec. 29, 1993 [JP] Japan ................................. 5-352217
Dec. 29, 1993 [JP] Japan ................................. 5-352218
Dec. 29, 1993 [JP] Japan ................................. 5-352219

[51] Int. Cl.$^7$ .......................... B32B 31/18; B32B 31/20
[52] U.S. Cl. ..................... 156/250; 156/267; 156/277; 156/291
[58] Field of Search .................. 156/250, 252, 156/253, 267, 277, 291, 516, 583.1, 257

[56] References Cited

U.S. PATENT DOCUMENTS

| | | |
|---|---|---|
| 3,793,016 | 2/1974 | Eichorn . |
| 4,752,352 | 6/1988 | Feygin . |
| 5,015,312 | 5/1991 | Kinzie . |
| 5,088,047 | 2/1992 | Bynum . |
| 5,354,414 | 10/1994 | Feygin . |
| 5,514,232 | 5/1996 | Burns ........................ 156/64 |
| 5,578,155 | 11/1996 | Kawaguchi . |
| 5,637,175 | 6/1997 | Feygin et al. . |
| 5,730,817 | 3/1998 | Feygin et al. ............... 156/64 |
| 5,876,550 | 3/1999 | Feygin et al. . |

FOREIGN PATENT DOCUMENTS

| | | |
|---|---|---|
| 4135971 | 5/1993 | Germany . |
| 63-039324 | 2/1988 | Japan . |
| 1319867 | 12/1989 | Japan . |
| 6190929 | 7/1994 | Japan . |
| 87/07538 | 12/1987 | WIPO . |
| 89/11680 | 11/1989 | WIPO . |
| 90/02361 | 3/1990 | WIPO . |
| 90/03893 | 4/1990 | WIPO . |
| 94/09971 | 5/1994 | WIPO . |
| 95/18010 | 7/1995 | WIPO . |

OTHER PUBLICATIONS

Laser Cut Sheet Laminated Forming Dies by Diffusion Bonding, Nakagawa et al, Apr. 22, 1995—Entire Document.

*Primary Examiner*—Michael W. Ball
*Assistant Examiner*—Michael A Tolin
*Attorney, Agent, or Firm*—Dennison, Scheiner, Schultz & Wakeman

[57] ABSTRACT

The invention relates to a sheet lamination modeling method and a sheet lamination modeling apparatus for forming a three-dimensional object by stacking and gluing sheets together. In the invention, an upper sheet (2Y) is stacked on top of a lower sheet (2X) which is cut into an effective area (V1) constituting the three-dimensional object and a waste area (U1) not constituting the three-dimensional object, an adhesive (4) is supplied between the lower sheet (2X) and the upper sheet (2Y) and onto an area which extends outwardly of an overlapping area covering both of an effective area (V2) of the upper sheet (2Y) and the effective area (V1) of the lower sheet (2X) to thereby glue the lower sheet (2X) and the upper sheet (2Y) together, and the upper sheet (2Y) is cut into the effective area (V2) and a waste area (U2). As a result, according to the invention, it is possible to easily obtain a strong three-dimensional object without separation or deformation.

17 Claims, 14 Drawing Sheets

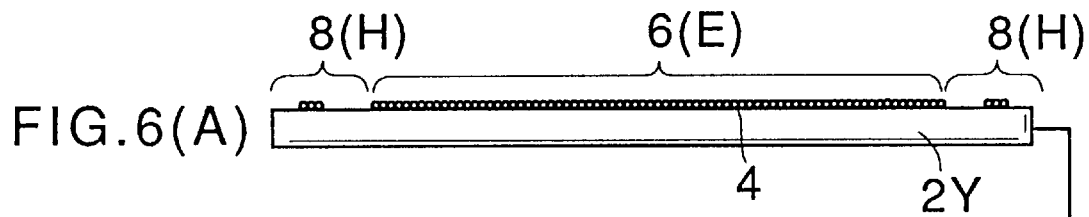
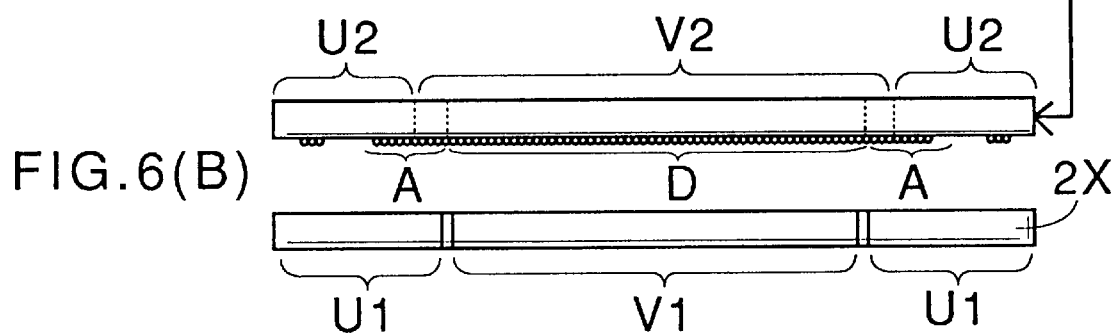
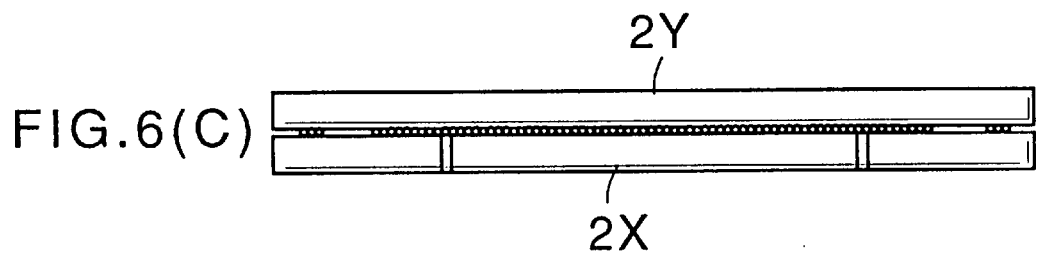
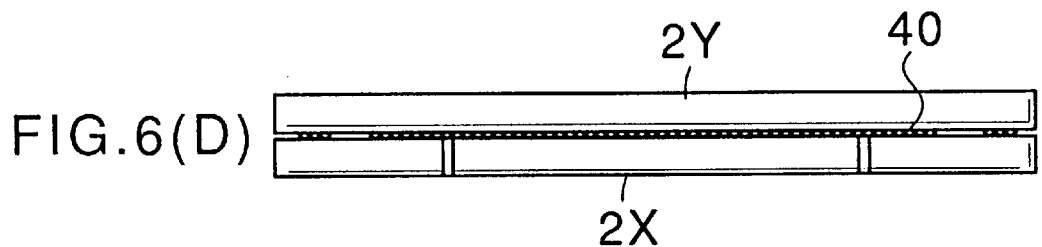
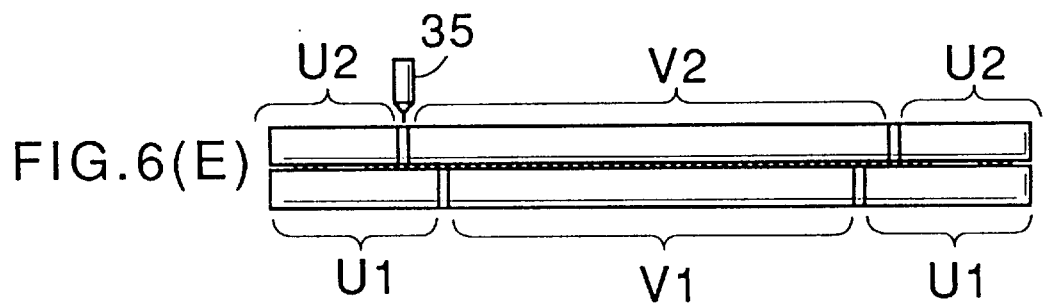

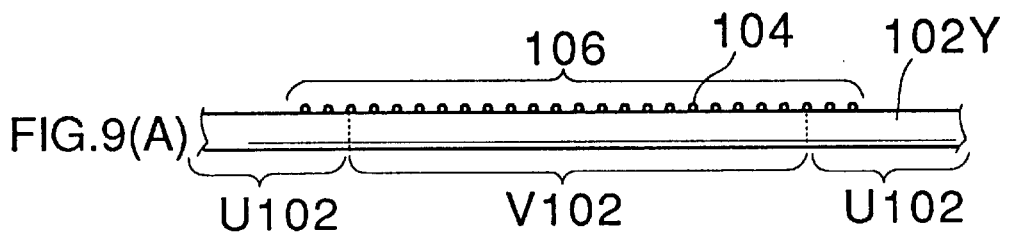
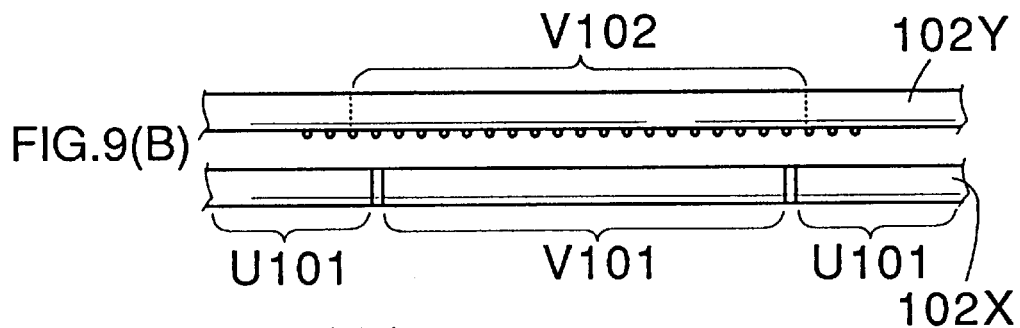
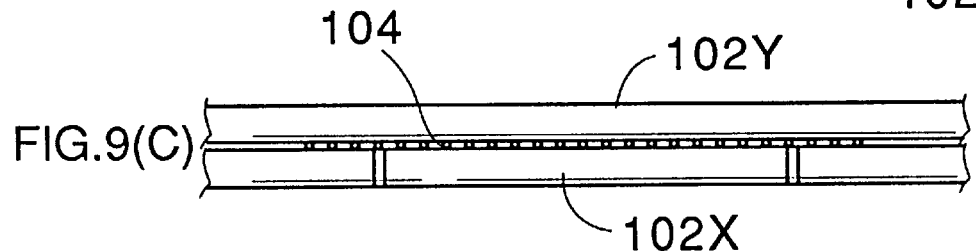
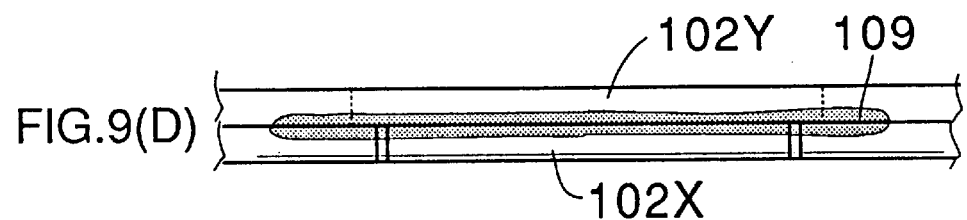
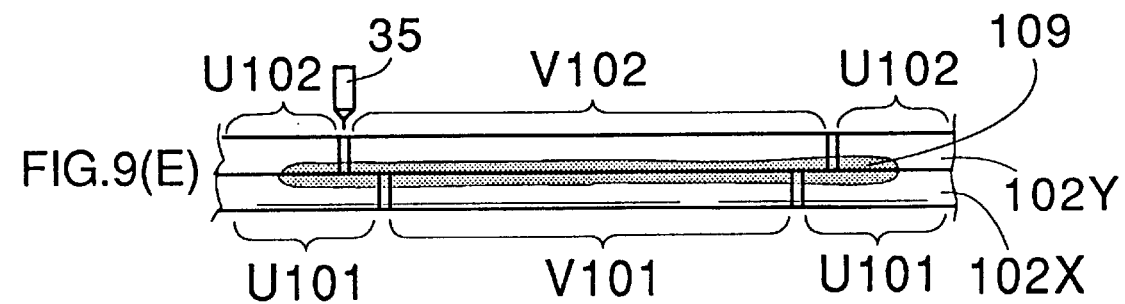

SHEET LAMINATION MODELING METHOD AND SHEET LAMINATION MODELING APPARATUS

This application is a continuation of U.S. application Ser. No. 08/663,081, filed Jun. 25, 1996, now abandoned, which was the National Stage of International Application No. PCT/JP94/02029, filed Dec. 1, 1994.

TECHNICAL FIELD

The present invention relates to a technique of forming a solid object, and more particularly to a method of forming a three-dimensional object easily with high accuracy by stacking and gluing sheets together and to a sheet lamination modeling apparatus.

BACKGROUND OF THE INVENTION

Conventionally, in order to fabricate a three-dimensional model having a complicated configuration, there has been proposed a method of stacking paper sheets on which heat-melting adhesive has been applied beforehand.

In this method, after stacking sheets one on the other, the sheets are glued together by heating the sheets with a hot roller. Then, an upper sheet is cut along a contour of a region constituting the three-dimensional object to be obtained.

However, according to this method, it was difficult to stack and glue paper sheets together with high accuracy to thereby fabricate a three-dimensional object having sufficient adhesive strength without separation of stacked sheets.

Further, paper sheets are subject to deformation by the effects of pressure, humidity, or the like. Additionally, with a certain thickness of the adhesive layer between the paper sheets, it was difficult to control the thickness in one adhesive layer to be even or to control the thickness of each adhesive layer to be the same. Therefore, it was difficult to ensure high fabricating accuracy of the three-dimensional model.

As an alternative way to fabricate a three-dimensional model, there has been proposed a photo-solidification modeling method. However, this method requires a step of light exposure by using a photo-solidifying resin. Therefore, the initial cost for preparing the equipment for performing this method is high, and the formed surface needs alcohol cleaning. Further, a secondary solidifying process is required after forming a model in order to obtain a perfect polymerization, so that it was difficult to fabricate such a three-dimensional object in an ordinary office.

DISCLOSURE OF THE INVENTION

Therefore, the present invention provides a sheet lamination modeling method which can easily fabricate a three-dimensional object having sufficient strength without separation of stacked sheets.

Further, the present invention provides a sheet lamination modeling method which can fabricate a three-dimensional object having high accuracy.

Further, the present invention provides a sheet lamination modeling apparatus which can fabricate a three-dimensional object with high accuracy.

(1) A first aspect of the invention provides a method of forming a three-dimensional object by stacking and gluing sheets together, which comprises the steps of providing a lower sheet cut into an effective area constituting the three-dimensional object and a waste area not constituting the three-dimensional object, providing an upper sheet to be stacked on top of the lower sheet, the upper sheet having an effective area constituting the three-dimensional object and a waste area not constituting the three-dimensional object, supplying an adhesive between the lower sheet and the upper sheet and onto an area which extends outwardly of an overlapping area covering both the effective area of the upper sheet and the effective area of the lower sheet, thereby forming an effective adhesive layer, gluing the lower sheet and the upper sheet together, and cutting the upper sheet into the effective area and the waste area.

According to this method, the upper and lower sheets are glued together by supplying the adhesive onto an area larger than an area covering both of the effective areas of the upper and lower sheets (hereinafter referred to as an overlapping area). Thus, the upper and lower sheets are reliably glued together on the overlapping area, and a three-dimensional object having great strength without separation or deformation can be obtained with ease.

(2) A second aspect of the invention provides a sheet lamination modeling method according to the first aspect of the invention, which comprises the additional step of forming an auxiliary adhesive layer by supplying the adhesive less densely than the effective adhesive layer, onto the outside of the effective adhesive layer.

According to this method, with the auxiliary adhesive layer, the sheets can be supported during gluing and cutting operation. Thus, positional errors during gluing and cutting operation can be reduced and warps of the sheets can also be reduced.

(3) A third aspect of the invention provides a sheet lamination modeling method according to the first aspect of the invention, wherein the adhesive is applied by electrostatic transfer.

According to this method, the adhesive can be applied by electrostatic transfer. Thus, it is possible to simply and easily fabricate a three-dimensional object in an ordinary office, and the amount and the position of the application of the adhesive can be set on a CAD system.

(4) A fourth aspect of the invention provides a sheet lamination modeling method according to the first aspect of the invention, wherein the upper sheet and the lower sheet are glued together under pressure.

According to this method, the effective adhesive layer (and the auxiliary adhesive layer) can be formed by pressurization. Thus, it is possible to make the lamination height of the object constant and to eliminate warps which may be generated on the stacked sheets. As a result, flatness of the stacked sheets can be secured and maintained, so that an object having sufficient accuracy can be obtained.

(5) A fifth aspect of the invention provides a method of forming a three-dimensional object by stacking and gluing sheets together, which comprises the steps of providing a lower sheet cut into an effective area constituting the three-dimensional object and a waste area not constituting the three-dimensional object, providing an upper sheet to be stacked on top of the lower sheet, the upper sheet having an effective area constituting the three-dimensional object and a waste area not constituting the three-dimensional object, supplying an adhesive between the lower sheet and the upper sheet, impregnating the adhesive into the upper sheet and the lower sheet under pressure, thereby forming a joined layer, and cutting the upper sheet into the effective area and the waste area.

According to this method, the adhesive is impregnated into both the upper and lower sheets by pressurization to form the joined layer through which the both sheets are tightly joined together. Thus, it is possible to eliminate fabrication errors which may be generated by the thickness of the adhesive layers, so that a three-dimensional object having high accuracy can be obtained.

Further, the impregnated adhesive forms the joined layer flat by pressurization at one time. Thus, it is possible to restrain warps or like defects of the sheets caused by moisture absorption, to thereby maintain flatness of the sheet lamination, and to secure the fabricating accuracy.

(6) A sixth aspect of the invention provides a sheet lamination modeling method according to the fifth aspect of the invention, wherein the adhesive is applied by electrostatic transfer.

According to this method, the adhesive is applied by electrostatic transfer, and thus, the amount and the position of the application of the adhesive can be easily controlled, so that a three-dimensional object having a complicated shape can be obtained.

(7) A seventh aspect of the invention provides a method of forming a three-dimensional object by stacking and gluing sheets together, which comprises the steps of providing a lower sheet cut into an effective area constituting the three-dimensional object and a waste area not constituting the three-dimensional object, providing an upper sheet to be stacked on top of the lower sheet, the upper sheet having an effective area constituting the three-dimensional object and a waste area not constituting the three-dimensional object, supplying an adhesive between the lower sheet and the upper sheet, gluing the lower sheet and the upper sheet together under pressure, cutting the upper sheet into the effective area and the waste area, thereby forming a sheet lamination block including the three-dimensional object, and pressing the sheet lamination block until the adhesive interposed between the sheets of the sheet lamination block is hardened.

According to this method, the sheet lamination block is continued to be pressed even after completion of the stacking operation, so that generation of warps by hardening the adhesive interposed in the sheet lamination block is restrained. Thus, a three-dimensional object having high accuracy can be obtained with ease.

(8) An eighth aspect of the invention provides a method of forming a three-dimensional object by stacking and gluing sheets together, which comprises the steps of providing a lower sheet cut into an effective area constituting the three-dimensional object and a waste area not constituting the three-dimensional object, providing an upper sheet to be stacked on top of the lower sheet, the upper sheet having an effective area constituting the three-dimensional object and a waste area not constituting the three-dimensional object, supplying an adhesive between the lower sheet and the upper sheet, gluing the lower sheet and the upper sheet together under pressure, cutting the upper sheet into the effective area and the waste area, thereby forming a sheet lamination block including the three-dimensional object, melting the adhesive interposed between the sheets of the sheet lamination block, and hardening the melted adhesive.

According to this method, after completion of the stacking operation, the adhesive interposed between the sheets of the sheet lamination block is melted and then hardened. Unlike the case where the adhesive is hardened during the stacking operation, all the sheets are glued together by hardening the adhesive under a state of less thermal distortion, so that generation of warps in the whole finished three-dimensional object can be prevented. Thus, a three-dimensional object having high accuracy can be obtained with ease.

(9) A ninth aspect of the invention provides a sheet lamination modeling method according to the eighth aspect of the invention, wherein, in the step of hardening the melted adhesive, pressurization of the sheet lamination block is continued until the adhesive is hardened.

According to this method, the adhesive interposed between the sheets forming the finished three-dimensional object is melted and then harden while being pressurized. Thus, warps caused by such hardening or warps already generated in the object can be effectively eliminated, so that a three-dimensional object having sufficient accuracy can be obtained with ease.

(10) A tenth aspect of the invention provides a method of forming a three-dimensional object by stacking and gluing sheets together, which comprises the steps of providing a lower sheet cut into an effective area constituting the three-dimensional object and a waste area not constituting the three-dimensional object, providing an upper sheet to be stacked on top of the lower sheet, the upper sheet having an effective area constituting the three-dimensional object and a waste area not constituting the three-dimensional object, supplying an adhesive between the lower sheet and the upper sheet, gluing the lower sheet and the upper sheet together under pressure, and cutting the upper sheet into the effective area and the waste area, wherein, in the above steps, the adhesive is maintained in a melted state to thereby form a sheet lamination block including the three-dimensional object, and the sheet lamination block is pressurized until the adhesive interposed between the sheets of the sheet lamination block is hardened.

According to this method, the sheets are not glued together during stacking operation, but the sheets are stacked to form the sheet lamination block with the adhesive held in a melted state, and after completion of the stacking operation, the adhesive interposed between the sheets is hardened while being pressurized. Thus, warps by internal stress are reduced which may be generated when the adhesive is hardened during the stacking operation for each sheet, so that a three-dimensional object having sufficient accuracy can be obtained with ease.

(11) An eleventh aspect of the invention provides an apparatus for forming a three-dimensional object by stacking and gluing sheets together, which comprises a table which moves upwardly or downwardly and on which a lower sheet cut into an effective area and a waste area is placed, interposing means for interposing an adhesive between the lower sheet and an upper sheet to be stacked on the lower sheet, pressing means fixedly disposed at a predetermined position for gluing together the upper sheet and the lower sheet on the table when the table is raised, and cutting means for cutting the upper sheet into an effective area and a waste area.

According to this apparatus, by the upward or downward movement of the table acting as a sole movable part, the sheets are moved to a bonding position or to a cutting position to adjust the bonding strength or the cutting height of the cutting means, thus permitting easy fine control of the working accuracy. Therefore, adjustment depending on the change of the height of the three-dimensional object under fabrication by stacking and gluing the sheets together, can be done easily. Thus, working errors during the gluing or the cutting operation, and thus modeling errors, can be reduced.

(12) A twelfth aspect of the invention provides a sheet lamination modeling apparatus according to the eleventh aspect of the invention, wherein the table is vertically movable, the pressing means is fixedly disposed right above the table, and the cutting means is disposed horizontally movably at a predetermined height between the table in the lowered position and the pressing means.

According to this apparatus, the table acting as a sole moving part is movable only in the vertical direction, and thus the cutting height with respect to the stacked sheets can be controlled with sufficient accuracy. As a result, modeling errors can be further reduced, and a three-dimensional object having high accuracy can be obtained.

(13) A thirteenth aspect of the invention provides a sheet lamination modeling apparatus according to the eleventh aspect of the invention, wherein, as the adhesive, an adhesive which displays adhesiveness by pressurization is used, and the pressing means include a pressurization surface for collectively pressurizing the upper sheet.

According to this apparatus, the sheets are glued together by pressurization, and therefore, light exposure or like operation is not required, so that it is possible to easily fabricate a three-dimensional object even in an ordinary office. Further, the bonding strength can be controlled by the raised position of the table.

Further, the sheets are collectively pressurized, so that the sheets and the adhesive can be formed both easily and flatly, and misalignment of the sheets can be prevented.

(14) A fourteenth aspect of the invention provides a sheet lamination modeling apparatus according to the eleventh aspect of the invention, wherein the interposing means is operable to supply the adhesive onto the upper sheet by electrostatic transfer.

According to this apparatus, the adhesive is applied by electrostatic transfer, and therefore, no special means for supplying adhesive is required. Thus, it is possible to provide a simple-construction of the apparatus in which an ordinary electrostatic transfer means can be utilized.

(15) A fifteenth aspect of the invention provides a sheet lamination modeling apparatus according to the eleventh aspect of the invention and further including heat retaining means for keeping warm a sheet lamination block on the table and heating means provided in the table for heating the sheet lamination block.

According to this apparatus, the adhesive interposed in the sheet lamination block is maintained in a melted state during the stacking operation, and thus, generation of warps of the sheets by hardening the adhesive between the sheets can be prevented. Further, the adhesive interposed in the sheet lamination block is melted after the stacking operation, so that any warps which may be generated during the stacking operation can be eliminated. Thus, a three-dimensional object having improved accuracy can be obtained.

BRIEF DESCRIPTION OF THE DRAWINGS

FIGS. 6(A) to 6(E) are sectional views of the sheets, showing a part of the sheet stacking process, in which FIG. 6(A) shows a state where the adhesive is transferred onto a sheet 2Y, FIG. 6(B) shows a state where the sheet 2Y with the adhesive applied thereon is disposed above a sheet 2X, FIG. 6(C) shows a state where the sheet 2Y is stacked on the sheet 2X, FIG. 6(D) shows a state where the sheet 2Y is glued to the sheet 2X, and FIG. 6(E) shows a state where the sheet 2Y is cut by the cutter 35;

FIGS. 9(A) to 9(E) are sectional views of the sheets, showing a part of the sheet stacking process according to a second embodiment, in which FIG. 9(A) shows a state where the adhesive is transferred onto a sheet 102Y, FIG. 9(B) shows a state where the sheet 102Y with the adhesive applied thereon is disposed above a sheet 102X, FIG. 9(C) shows a state where the sheet 102Y is stacked on the sheet 102X, FIG. 9(D) shows a state where the sheet 102Y is pressed onto the sheet 102X to form a joined layer, and FIG. 9(E) shows a state where the sheet 102Y is cut by the cutter 35;

BEST MODES OF EMBODYING THE INVENTION

Now, the embodiments embodying the present invention will be described with reference to FIGS. 1 to 15.

In each embodiment which will be described hereinafter, any sheet from which a three-dimensional object can be fabricated by stacking and gluing may be used as sheet. Such sheets include paper, cloth and plastic film.

Adhesives can be appropriately selected depending on the strength required for the three-dimensional object to be fabricated as well as the kind of the sheet in use and the method of feeding the adhesives.

Electrostatic transfer means that an electrostatic latent image formed on a drum by electrostatic recording, electro-printing, laser recording or like methods, with particles tentatively fixed thereon, is electrostatically transferred onto sheets.

First Embodiment

A first embodiment will now be described with reference to FIGS. 1 to 8.

In this embodiment, as sheets 2, plain paper (woodfree paper) having the thickness of 0.1 mm and the size of 297 mm×420 mm is used. Here, instead of cut sheets, a continuous roll sheet may be used as it is cut during operation.

As an adhesive 4, an electron toner for a copying machine from which pigment is removed and which mainly consists of thermoplastic resins of the polyethylene family is used. Here, it is to be noted that electron toners usually consist mainly of thermoplastic resins as binder and pigment, and that electron toners containing pigment may be used without removing the pigment as adhesive of the present invention.

Further, adhesives which can be glued onto the sheets 2 only by pressurizing without heating (for instance, toners, such as a capsule toner for electrostatic latent image development disclosed in Japanese Patent Publication No. 59-189354) may be used. In case of using such pressure-sensitive adhesives, the adhesives can be melted only by pressurization by means of a simple plate without using a heater plate 32 which will be described later. Therefore, such pressure-sensitive adhesives offer advantages that the equipment cost can be reduced, that greater safety is ensured to permit automated fabrication, and that the time which will be required for heating a heater plate is not needed.

Figure 1:
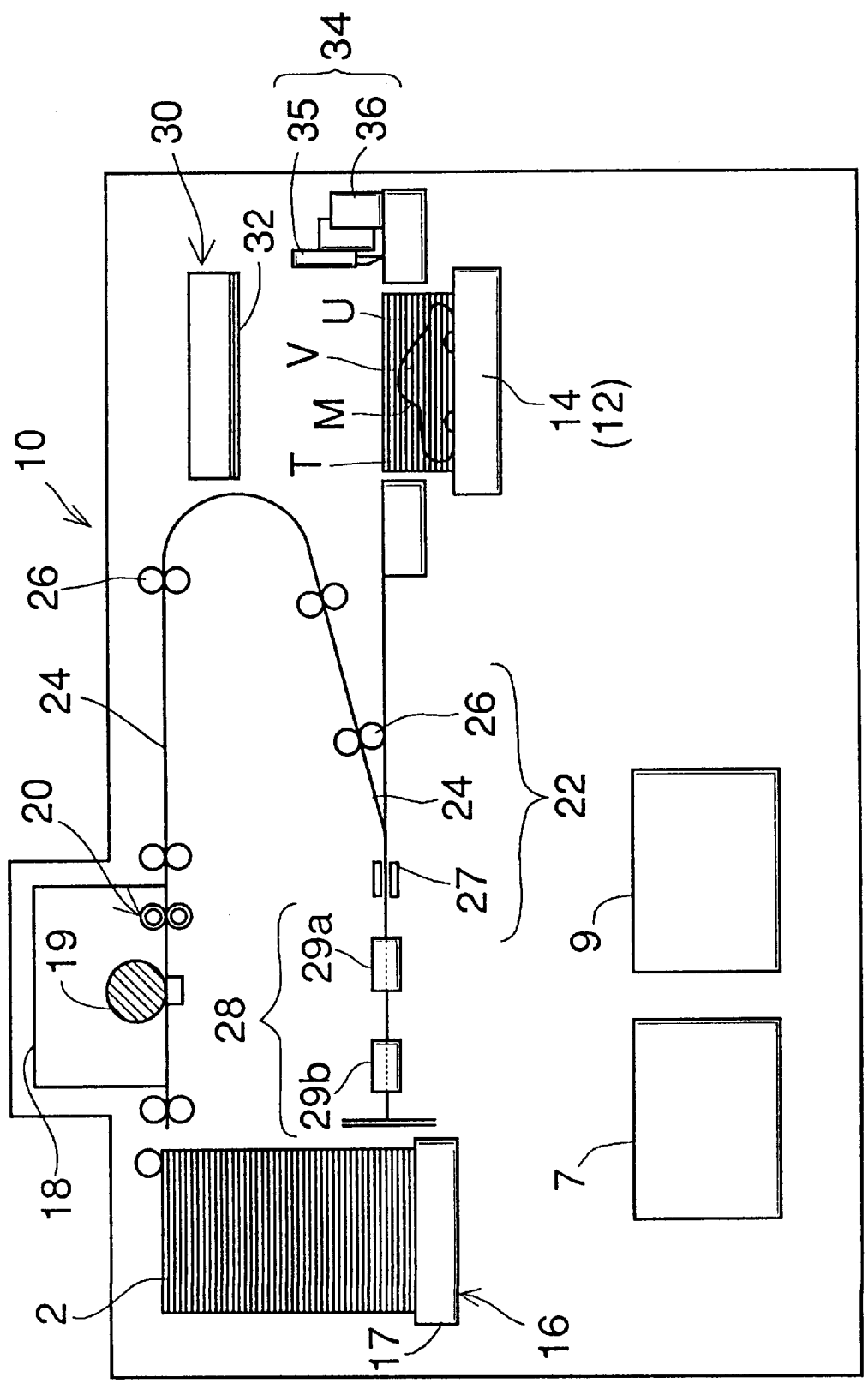
FIG. 1 is a schematic view showing the overall construction of a sheet lamination modeling apparatus according to a first embodiment of the invention.

FIG. 1 shows a sheet lamination modeling apparatus of this embodiment. The sheet lamination modeling apparatus is mainly comprised of a data processing section 7, a control section 9 and a sheet lamination modeling section (hereinafter referred to as modeling section) 10.

The data processing section 7 prepares two-dimensional data representing the sectional configuration of the three-dimensional object to be obtained, on the basis of the data representing the three-dimensional configuration of the object, and supplies the sectional configuration data to the modeling section 10.

In this embodiment, the data representing the three-dimensional configuration of the object is supplied to the data processing section 7 from a three-dimension CAD system. It is well-known in the field of CAD systems to obtain two-dimensional contour data representing the sectional configuration on the basis of such three-dimensional configuration data.

The data processing section 7 converts the two-dimensional contour data, which has been converted from the three-dimensional data supplied from the three-dimension CAD system, into raster data and vector data and supplies the raster data and the vector data to a laser printer section 18 and a cutting plotter section 34. The raster data represents the sectional contour of the three-dimensional object, in which one side of the sectional contour is an effective area constituting the three-dimensional object and the other side is a waste area not constituting the three-dimensional object. Sectional vector data and raster data are prepared for each sheet 2.

The control section 9 performs sequential control of the laser printer section 18 and the cutting plotter section 34 and also performs positional control of the height of a table 14.

The modeling section 10 comprises a table section 12, a feeding tray section 16, the laser printer section 18, a conveying section 22, a heater plate section 30, and the cutting plotter section 34.

The table section 12 includes the table 14 on which the sheet lamination T under construction is placed and includes a motor (not shown) which is used to move the table 14 vertically. Further, the table section 12 is provided with a detector (not shown) for detecting the absolute position (height) of the table 14, and the height position of the table 14 is controlled by the control section 9.

The table 14 is driven by the motor and is moved upwardly toward the heater plate 30 which will be described later every time each sheet 2 is stacked and is moved downwardly such that the height of the top surface of the sheet lamination T is brought to a predetermined height position. The lowered position of the table 14 where the top surface of the lamination T is at the predetermined height is set to be lowered by the thickness of the sheet 2 (to be exact, by the thickness of the sheet 2 and the thickness of the adhesive 4) every time each sheet 2 is stacked.

The feeding tray section 16 includes a tray 17 on which a plurality of sheets 2 are placed. A motor (not shown) is driven to raise and lower the tray 17. The feeding tray section 16 supports the sheets 2 and supplies the sheets 2 one by one to the laser printer section 18.

The laser printer section 18 electrostatically transfers the adhesive 4 onto the sheets 2 and is of the same type as used in ordinary laser printers and copying machines.

The laser printer section 18 forms an electrostatic latent image on a drum 19 by laser beam exposure on the basis of the raster data supplied from the data processing section 7 and forms a shape of the adhesive 4 on the drum 19, and electrostatically transfers the adhesive from the drum 19 onto the sheets 2.

The laser printer section 18 includes a fixing section 20 for fixing the adhesive 4 transferred onto the sheets 2. The sheets 2 are conveyed through the fixing section 20 by the conveying section 22.

As shown in FIG. 1, the conveying section 22 comprises chains 24, sprockets 26, sheet support mechanisms 27 and a motor (not shown) for driving the sprockets 26. The chains 24, the sprockets 26, and the sheet support mechanisms 27 are each disposed on the both sides in the width direction of the sheets 2 to be conveyed (in the direction vertical to the conveying direction).

The support mechanisms 27 are disposed in opposed relation to each other on the chains 24 on the both sides for supporting the sheets 2.

In the conveying section 22, the environmental conditions such as humidity are controlled by an air conditioner, a fan or the like machine so as to convey the sheet 2 from the laser printer section 18 to the table section 12 without causing moisture absorption or the like of the sheet 2.

The conveying section 22 also includes on the front end thereof an intermediate tray section 28 for inverting and temporarily placing the sheet 2. The intermediate tray section 28 includes a tray 29a and a jogger 29b, and the sheet 2 temporarily placed on the tray 29a are jogged from every direction by the jogger 29b for positioning and is supplied to the table section 12. Further, the intermediate tray section 28 also serves to control the operations of the laser printer section 18 and the cutting plotter section 34 performed by the control section 9.

The heater plate section 30 is fixedly disposed right above the table section 12 at a predetermined level, and comprises a plate 32 disposed on the lower side thereof and having a size sufficient to press the whole surface of the lamination T and a heater unit (not shown) for heating the plate 32 to a predetermined temperature.

When the table 14 with the lamination T placed thereon is raised to press the pressing surface of the plate 32, an upper sheet 2Y (see FIG. 4) stacked on the top of the lamination T and an lower sheet 2X placed right under the sheet 2Y are glued together.

The heating temperature of the plate 32 has to be suitably set depending on the kinds of the sheet 2 and the adhesive 4 to be used, the magnitude of the pressure to be applied thereto, or other factors.

The pressing surface of the plate 32 is treated for separation by fluorocarbon resin, silicon or the like in order that the upper sheet 2Y pressed on the pressing surface is not adhered thereto but is readily separated therefrom.

The cutting plotter section 34 comprises a cutter 35 and an XY plotter 36 which the cutter 35 is secured to and which moves the cutter 35 horizontally on the basis of the vector data supplied from the data processing section 7.

The cutting plotter section 34 is positioned at a predetermined level below the heater plate section 30 and above the table section 12, and at a position where the vertical movements of the table 14 and the paper feeding onto the table 14 are not disturbed.

The cutter 35 cuts only the top one of the sheets 2 stacked together on the table 14, always at a constant height position by the XY plotter 36.

In other words, the cutter 35 is always at a constant cutting height without being raised or lowered and is made operable by controlling the height of the table 14.

It will be noted that, besides the cutter 35, a laser cutter, an ultrasonic cutter or the like may be used as cutting means. The use of the cutter 35 is advantageous in that the initial costs can be reduced, there is no need of preparing the dust-removing equipment, there is no danger of fire, and the control of the cutting depth is easy.

The modeling section 10 thus constructed is accommodated in a cabinet, where the humidity and temperature conditions around the sheets 2 are controlled. In addition, in this embodiment, an air conditioner (not shown) is also provided within the cabinet to control with high accuracy the heat and humidity generated in the modeling section 10.

Now, the operation of fabricating a three-dimensional object by the use of a modeling apparatus thus constructed will be described with reference to FIG. 2.

Figure 2:
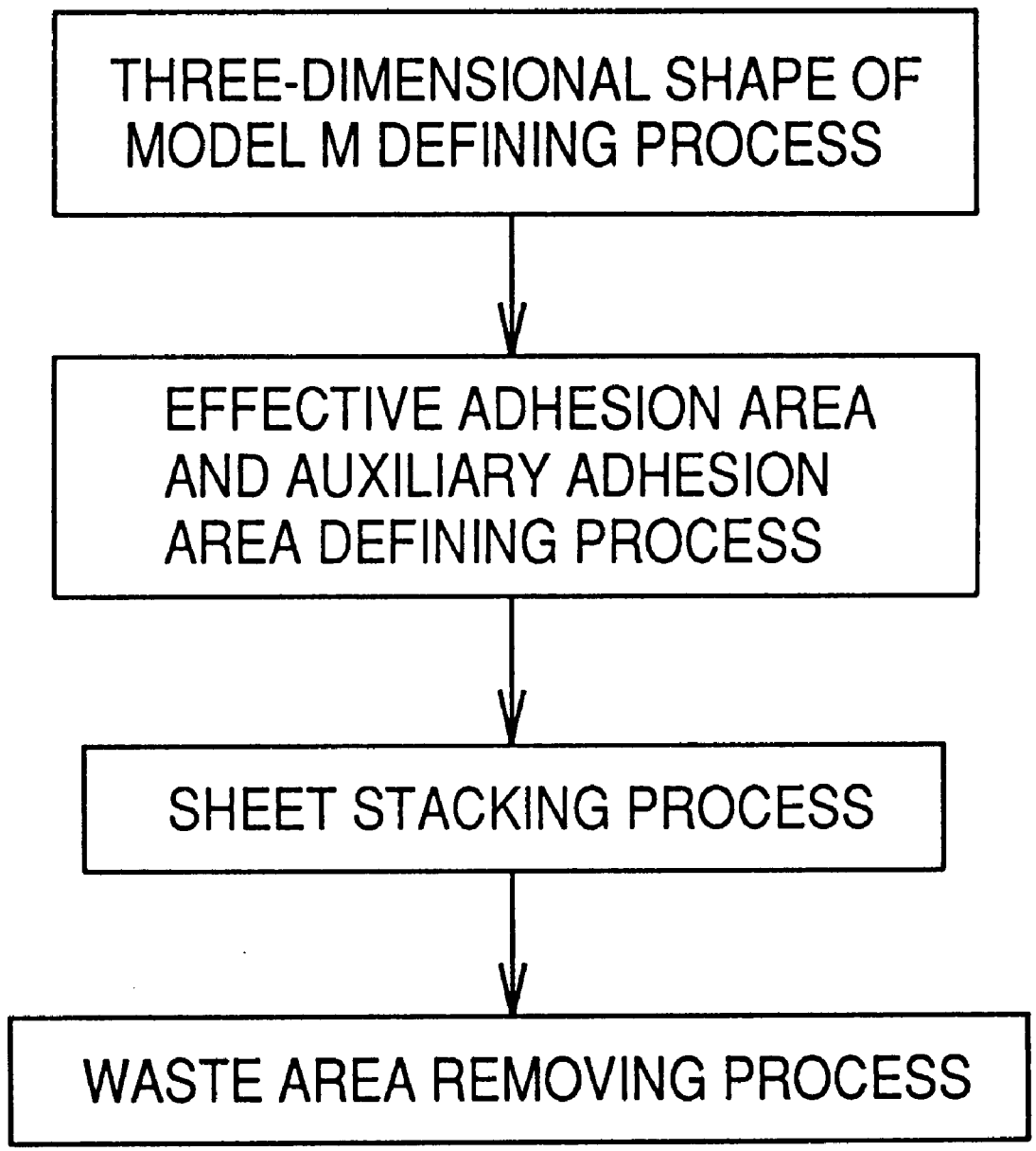
FIG. 2 is a block diagram showing the operation according to the first embodiment.

FIG. 2 is a block diagram showing the operation of fabricating a three-dimensional object M by stacking and gluing the sheets 2 together by the use of the apparatus.

Figure 3:
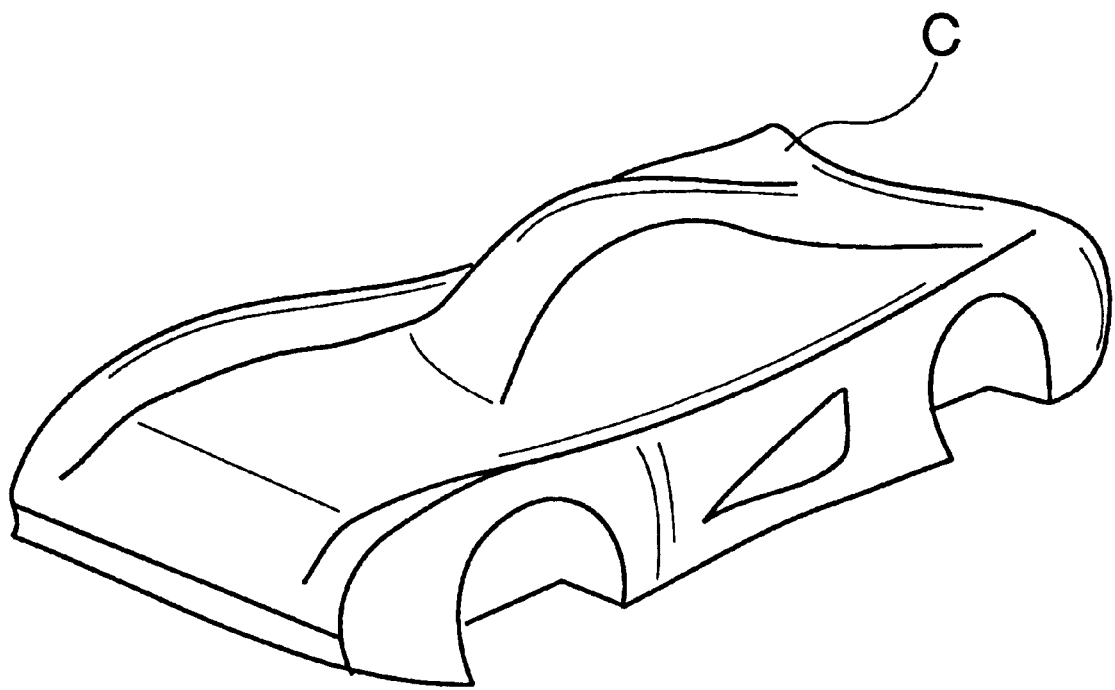
FIG. 3 is a view of the prototype of a three-dimensional object to be obtained in the first embodiment.

In a first step, a process of defining a three-dimensional shape of a model M to be fabricated, such as the three-dimensional shape of a car model C, is designed by a three-dimension CAD system. As a result, a three-dimensional shape data for making the model M such as the car model C shown in FIG. 3 is defined by the three-dimension CAD system. The model M is constructed within the sheet lamination T formed by stacking and gluing the sheets 2 together.

Next, a process of defining an effective adhesion area E and an auxiliary adhesion area H on each section will be performed. In this process, a two-dimensional contour data of each section which is sliced horizontally with the thickness of the sheets 2 to be stacked to fabricate the model M is obtained. Here, of each section, the effective adhesion area E and the auxiliary adhesion area H in the sheet 2Y which is to be stacked at a predetermined height position will be described.

Figure 4A:
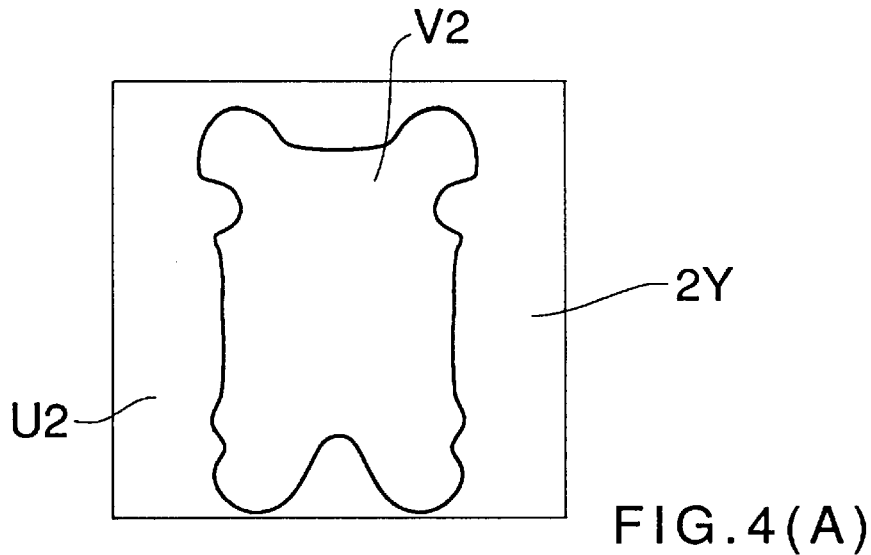
FIG. 4(A) is a plan view showing an effective area and a waste area of the sheet 2Y.

As shown in FIG. 4(A), the inside of the contour in the two-dimensional data obtained for the sheet 2Y comprises an effective area V2 which is used to construct the model M. An area outside of the effective area V2 in the sheet 2Y comprises a waste area U2 which is not used to construct the model M.

The effective adhesion area E and the auxiliary adhesion area H in the sheet 2Y are determined by the effective area V2 in the sheet 2Y and an effective area V1 in the sheet 2X stacked just below the sheet 2Y.

Figure 4B:
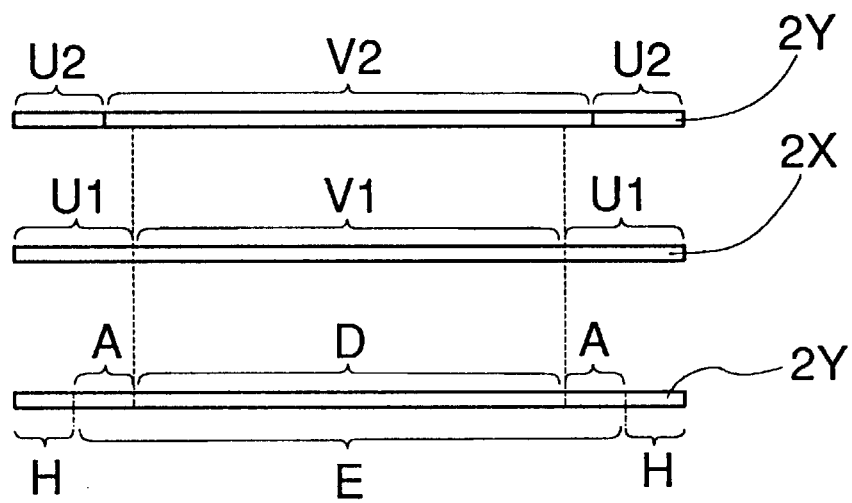
FIG. 4(B) is a sectional view of sheets 2Y and 2X and illustrates a lap of the respective effective areas and a relationship between an effective adhesive area and an auxiliary adhesive area.

In order to determine the effective adhesion area E, data of the effective area V1 in the sheet 2X is also obtained in the same manner as in the sheet 2Y. Then, as shown in FIG. 4(B), an area covering both of the effective area V2 of the sheet 2Y and the effective area V1 of the sheet 2X is defined as an overlapping area D. Actually, the sheet 2Y and the sheet 2X are glued together on this overlapping area D.

Figure 4C:
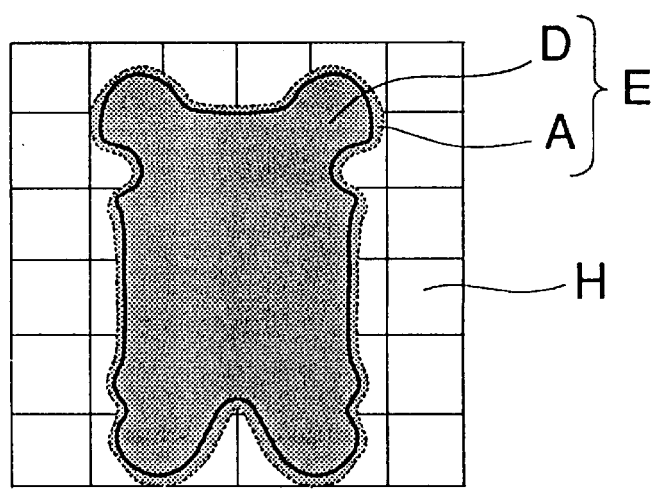
FIG. 4(C) is a plan view illustrating the effective adhesive area and the auxiliary adhesive area of the sheet 2Y.

Then, as shown in FIGS. 4(B) and 4(C), a supplementary area A having a predetermined width is provided outside of the overlapping area D. The overlapping area D and the supplementary area A determine the effective adhesion area E. The effective adhesion area E extends outwardly of the overlapping area D. The width of the supplementary area A is determined in consideration of errors which may be caused in transfer of the adhesive 4 onto the sheets 2, thermo-contraction of the sheets 2 and positioning of the sheets 2 onto the table 14. In this embodiment, the width of the supplementary area A is 0.5 mm, and the maximum error which may caused in the above processes is within this width.

With the effective adhesion area E thus provided, the sheet 2Y and the sheet 2X are glued together on the area slightly wider than the area which actually requires adhesion.

Further, the amount and the density of the adhesive 4 to be applied to the sheet 2 are adjusted depending on the degree (thickness, density, distribution of patterns, etc.) of patterning the effective adhesion area E on the CAD system, such that the adhesive 4 can sufficiently adhere the overlapping area D by heat-pressure bonding. In order to maintain the flatness of the overlapping area D, it is preferable to pattern the overlapping area D uniformly in a continuous pattern.

Therefore, the way of applying an adhesive is not limited to applying an adhesive to the whole area, but it can be properly determined in view of the strength required for the model M to be obtained, the cost and the kind of the adhesive 4, the material of the sheet 2 and like conditions. For example, it is also possible to pattern the adhesive in the effective adhesive area E in a fine mesh.

Further, it is possible to secure the adhesion area even in the case where the adhesive 4 is applied scatteringly, since the adhesive 4 is liquefied by heating as it is pressed during pressurization of the upper sheet 2Y.

In this embodiment, the effective adhesion area E is thickly painted all over on the CAD system.

When the effective adhesion area E is thus defined, the auxiliary adhesion area H is defined. Specifically, the area outside of the effective adhesion area E makes the auxiliary adhesion area H.

The auxiliary adhesion area H is not an area directly required for forming the model M, but an area for forming the surrounding portion which surrounds and supports the model M to be formed within the lamination T.

Therefore, by also applying the adhesive 4 onto this auxiliary area H to glue the sheets 2 together, any warp which may otherwise be generated in the overlapping area D of the lamination T can be eliminated. Specifically, since the adhesive 4 applied onto the auxiliary adhesion area H and solidified acts as a beam on the sheets 2, it can prevent warps on the sheet 2Y which may be generated by moisture absorption under the influence of the ambient conditions during the period from application of the adhesive 4 to pressure bonding. Therefore, the adhesive 4 applied on the auxiliary adhesion area H can secure the flatness of each sheet 2 itself and can also secure the flat stacking condition of the sheets 2 in the lamination T. As a result, it can prevent warps in the overlapping area D as well.

Further, the auxiliary adhesion area H is provided to form a support during heat-pressure bonding operation and during cutting operation with the waste areas U1 and U2 temporarily glued and stacked together.

Therefore, the pattern of the adhesive 4 in the auxiliary adhesion area H on the CAD system is determined such that the flatness of the sheet 2Y in the lamination T can be secured in all directions. In addition, the pattern of the adhesive 4 in the auxiliary adhesion area H is determined such that the sheets 2 in the auxiliary area H can be glued together to an extent sufficient to form a support during heat-pressure bonding operation and cutting operation and can be easily separated or broken after fabrication.

As patterns effective to prevent warps, patterns which have no particular orientation and which are continuous all over the auxiliary adhesion area H, such as a mesh or web-like pattern, are preferable. Considering the costs of the adhesive 4 and other factors, patterns may be drawn in fine lines.

Further, if the adhesive 4 in use is fluidified by its fluidity by heat pressure, the adhesive 4 may be applied in dots or in dotted lines in the auxiliary area H.

In this embodiment, the auxiliary adhesion area H is patterned with large meshes in fine lines. In the auxiliary adhesion area H, the adhesive 4 is supplied less densely than in the effective adhesion area E.

Next, the stacking process of the sheets 2 will be described with reference to FIGS. 5(A) to 5(F), 6(A) to 6(E), 7 and 8.

Here, the stacking process of the sheet 2Y referred to in the preceding process of this embodiment will be explained.

First, the data of the formed areas as the effective adhesion area E and the auxiliary adhesion area H on the sheet 2Y which have been defined in the preceding process are supplied from the three-dimension CAD system to the laser printer section 18, and then, according to the data, the charged and sensitized drum 19 is scanned and exposed by laser beams of the exposure section to form an electrostatic latent image on the drum 19.

Figure 5A:
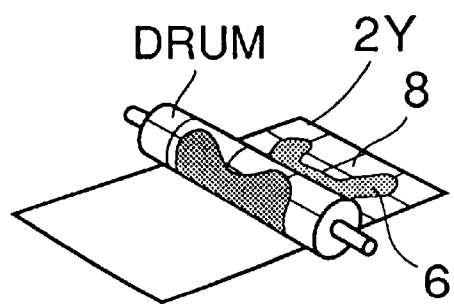
FIG. 5(A) shows a state where an adhesive is transferred onto the sheet 2Y by a drum.

Then, in accordance with an ordinary process of the electro-printing method by a PPC system, a powder adhesive 4, instead of an electron toner, is adhered onto the electrostatic latent image on the drum 19, so that the electrostatic latent image is transformed into an adhesive pattern. The adhesive pattern on the drum 19 is transferred onto the upper sheet 2Y which has been fed by the feeding tray section 16, and is melted and fixed by heating or like operation so that adhesive layers 6 and 8 are formed. Specifically, as shown in FIGS. 5(A) and 6(A), an effective adhesive layer 6 and an auxiliary adhesive layer 8 are formed to correspond to the effective adhesion area E and the auxiliary adhesion area H, respectively.

Further, in this embodiment, part of the adhesive 4 on the adhesive layers 6 and 8 is impregnated into the sheet 2Y when fixed by a roller. Therefore, a long time interval is taken before a pressurizing process is started, and even under the condition in which the sheet 2Y absorbs moisture, the impregnated adhesive 4 can effectively act as core for suppressing distortion (warp) which may be generated in the sheet 2Y. Such impregnation, however, is not necessarily required, and only the electrostatic transfer may be performed.

Figure 5B:
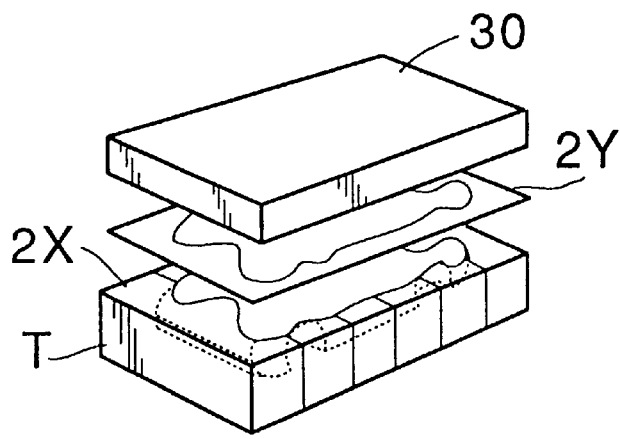
FIG. 5(B) shows a state where the sheet 2Y is stacked on top of a sheet lamination T.

Next, the upper sheet 2Y is supported by the sheet support mechanism, and is fed through the intermediate tray section 28 to be inverted and positioned, and is supplied to the table section 12 (see FIGS. 5(B) and 6(B)).

In this embodiment, the sheet 2Y is conveyed from the laser printer section 18 to the table section 12 within several seconds to the order of ten seconds, and the humidity and temperature conditions around the conveying section 22 are controlled. As a result, the sheet 2Y does not suffer distortion which may be caused by absorbing moisture during conveyance. Therefore, in the case where a long time interval is taken from the transfer process to the stacking process, it is preferable to place the sheet 2Y in the environment of low humidity so as to prevent the sheet 2Y from absorbing moisture during the period from the completion of transfer to the pressurization on the table.

Then, as shown in FIG. 6(C), the sheet 2Y is stacked on the lower sheet 2X which has been placed on the table 14 and which has been cut into the effective area V1 and the waste area U1 and stacked in layer.

At this time, the upper sheet 2Y which has been inverted during conveyance is placed such that the adhesive layers 6 and 8 are brought into contact with the surface of the lower sheet 2X.

Here, the lower sheet 2X has been already placed on the upper surface of the lamination T of several sheets 2 in accordance with the processes of this embodiment.

Further, at the time of stacking of the sheet 2Y, even if mechanical errors were caused in conveying the sheet 2Y or in setting the sheet 2Y on the table 14, the whole overlapping area D is reliably covered with the effective adhesive layer 6 since the effective adhesive layer 6 is formed to a size large enough to offset the errors.

Then, the table 14 is raised and the lamination T (including the lower sheet 2X and the upper sheet 2Y) is pressed under a predetermined pressure toward the lower surface of the plate 32 which is disposed above the table 14 and heated to a predetermined temperature. As a result, the adhesive 4 interposed between the lower sheet 2X and the upper sheet 2Y is melted so that the both sheets 2X and 2Y are tightly glued and joined together through the adhesive layer 40 (see FIG. 6(D)).

The lift (raised position) of the table 14 is controlled by the control section 9 such that a predetermined pressure can be constantly obtained.

At this time, the plate 32 presses the whole area of the sheet 2Y at one time, so that unlike the case of pressurizing by a roller, misalignment of the sheet 2Y is not caused.

Further, the sheets 2 which have been already stacked together form the lamination T in an integral structure including the effective area and the waste area, and the uppermost sheet 2Y is supported over the entire area from below, so that pressure is uniformly applied on the entire area of the overlapping area D which needs heat-pressure bonding.

In addition, it is possible to obtain uniform thickness of the adhesive layers 6 and 8 between the sheets 2X and 2Y and uniform thickness of the sheet 2Y.

Further, by thus applying pressure, the melted adhesive 4 is impregnated into the sheets 2X and 2Y. The adhesive 4 at this time is in a visco-elastic state, so that it is impregnated into the sheet 2Y with pressure.

The pressing by the plate 32 also serves to restrain the warping of the sheet 2Y. Specifically, even if a warp is generated in the sheet 2Y in the stacking process, the pressing on the sheet 2Y also serves to correct the warp. In addition, it also serves to form the adhesive layers 6 and 8 interposed between the sheets 2X and 2Y to be flat by means of the sheet 2Y. Therefore, a layer which serves to glue the sheets 2X and 2Y together and which restrains deformation such as warping is formed.

The pressing by the plate 32 is repeated and repeatedly restrains the repulsion of the sheets 2 which is gradually caused after stacking, so that the model M without deformation can be obtained.

Further, the repeated pressing also restrains contraction of the adhesive layers 6 and 8, and the adhesive layer 40 itself acts to restrain warping of the sheet 2Y.

As a result, the sheet 2Y is reliably maintained in a flatly stacked state even after stacking.

Thereafter, the table 14 is lowered.

Thus, the sheet 2Y is closely attached to the upper surface of the sheet 2X via the adhesive layers 6 and 8 and thus forms part of the lamination T.

Then, when the adhesive 4 is hardened by cooling, the sheets 2X and 2Y are glued and joined together. However, in the stacking process, the adhesive 4 is not always hardened immediately after application of pressure to fully glue the sheets 2X and 2Y together. When another sheet 2 is stacked on the sheet 2Y and glued by hot pressing, the adhesive 4 is indirectly heated and is relatively gradually hardened.

In the sheets 2X and 2Y thus glued together, the area having the effective adhesive layer 6 provided thereon is glued strongly, and the area having the auxiliary adhesive layer 8 is glued less strongly.

Further, the effective adhesive layer 6 is larger than the overlapping area D which actually needs gluing, so that the overlapping area D is reliably glued onto the lower sheet 2X even if the above-mentioned misalignment or heat contraction of the sheets 2 is caused.

In the hot press gluing process, since the adhesive 4 is melted, the ambient environment is not deteriorated without causing evaporation of any harmful substance or generation of malodor.

The vertical movement of the table 14 is controlled by the detector and the control section 9, and the table 14 is lowered to a position where the working section of the cutter 35 which is moved two-dimensionally by the XY plotter 36 can cut only the upper sheet 2Y stacked and glued on top of the lamination T.

The pressing position (raised position) and the cutting position (lowered position) are controlled only by the vertical movement of the table 14. In other words, only the table 14 acts as a vertically moving part. Such an arrangement permits easy fine adjustment of the height of the lamination T formed by stacking the sheets 2 in sequence, by the thickness of a layer of one sheet (to be exact, the total thickness of the sheet 2 and the adhesive layers 6 and 8), so that possible errors are minimized.

Figure 5C:
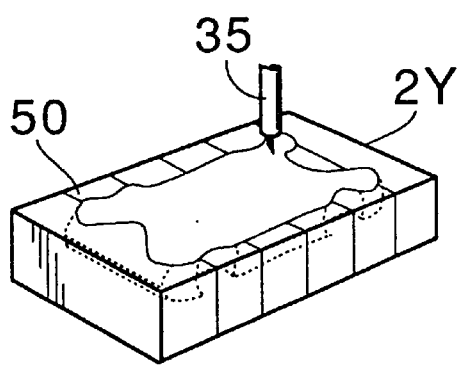
FIG. 5(C) shows a state where the stacked sheet 2Y is cut into the effective area and the waste area by a cutter 35.

Then, as shown in FIGS. 5(C) and 6(E), the upper sheet 2Y is cut into the effective area V2 and the waste area U2 by the cutter 35 which is driven by the XY plotter 36 on the basis of the data supplied from the data processing section 7.

In the vicinity of the contour of the effective area V2, the sheets 2 are tightly glued to each other by the effective adhesive layer 6 and the auxiliary adhesive layer 8, so that any misalignment or separation of the upper sheet 2Y with respect to the lower sheet 2X is not caused by the movement of the cutter 35.

Figure 7:
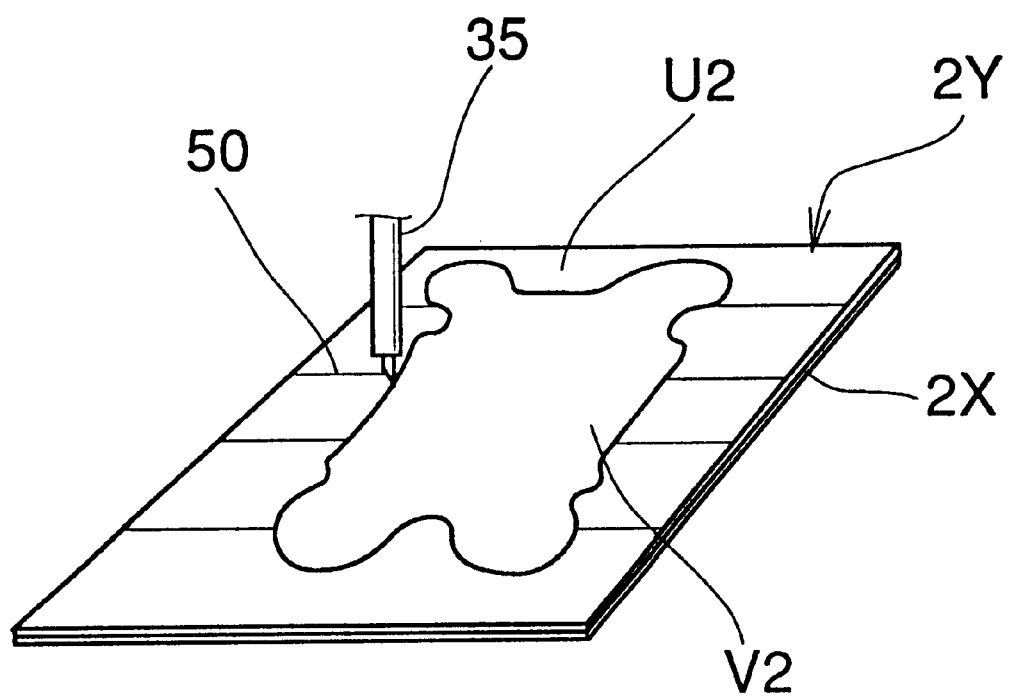
FIG. 7 shows the cutting operation of a sheet by the cutter 35.

Then, as shown in FIG. 7, the waste area U2 is cut and divided into pieces along predetermined dividing lines 50 from the contour of the effective area V2 outwardly toward the edge of the sheet 2Y.

Figure 5D:
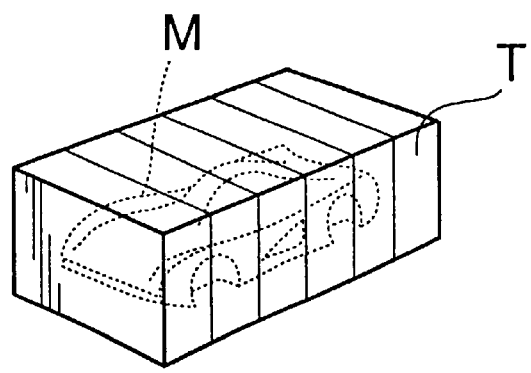
FIG. 5(D) shows a state where a model M is fabricated within the sheet lamination T.
Figure 5E:
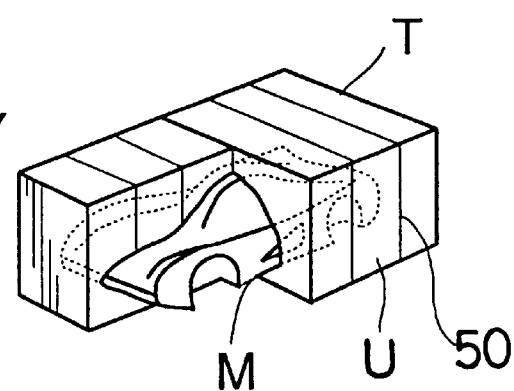
FIG. 5(E) shows a state where the waste area is removed away from the sheet lamination T.

The dividing lines 50 serve to facilitate removal of the stacked and loosely glued waste area U after completion of fabrication (see FIG. 5(E)). The waste area U can be three-dimensionally divided into pieces for removal. When the dividing lines 50 are provided around the complicated contour, removal of the waste area U is made easier, and in the case of the object having an irregular contour, it is suitable to provide many dividing lines 50.

The dividing lines 50 are provided on the basis of the data which has been converted from the data inputted from the three-dimension CAD system in the data processing section 7 and which has been supplied to the cutting plotter section 34.

Figure 8:
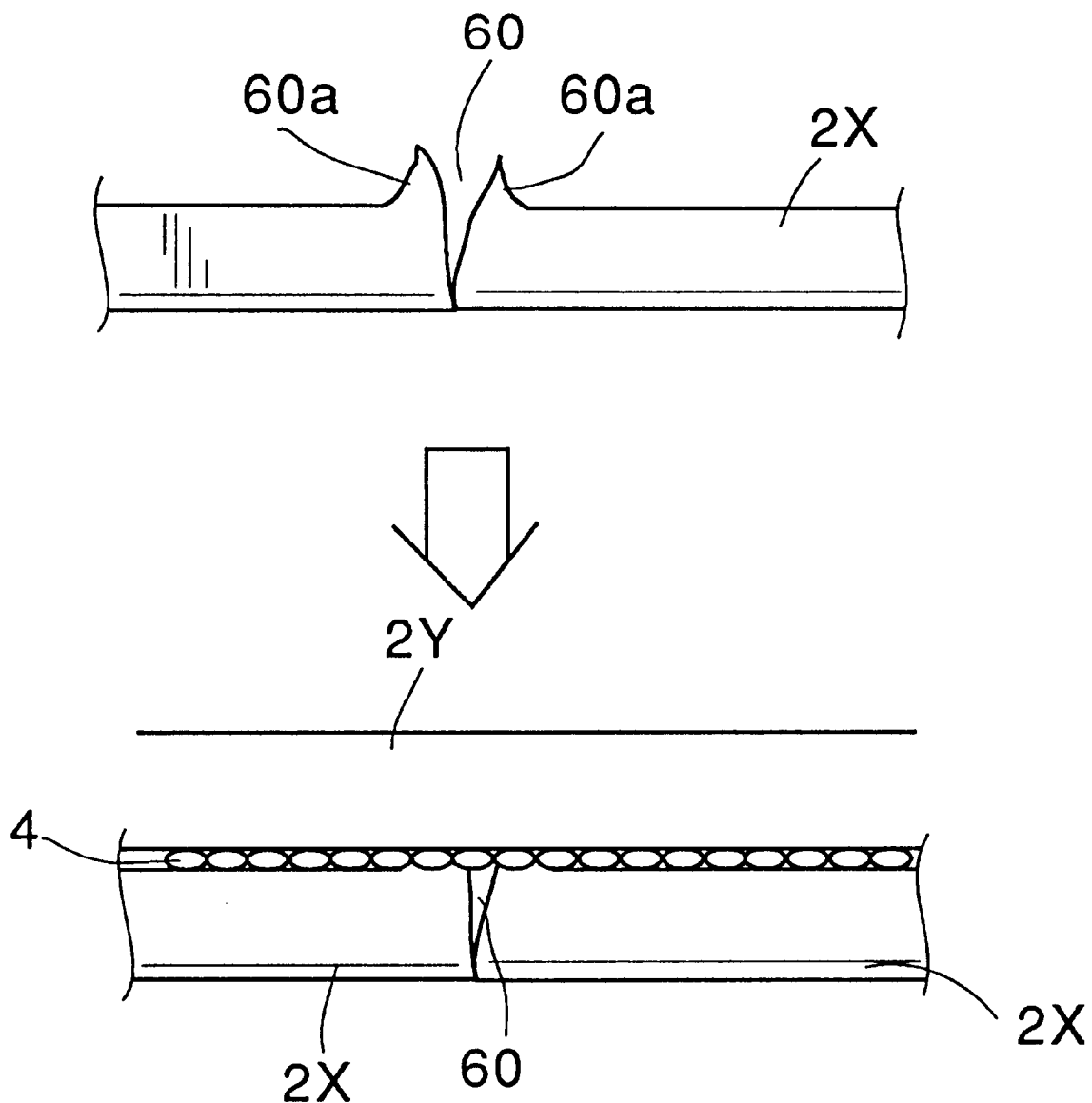
FIG. 8 is a sectional view showing the state of a flaring part of the cut portion changed by heat pressure fitting.

In this embodiment, a cutter is used, but, as shown in FIG. 8, when a cutter is used to cut the sheet 2X, a flaring portion 60a is formed on the both sides of the cut section. However, the flaring portion 60a is completely broken down by the pressure applied by stacking the sheet 2Y on the sheet 2X, or it is absorbed by the thickness of the adhesive layer. Therefore, adverse effect by the flaring portion 60a is eliminated in the lamination T. It will be noted that, besides a cutter, an ultrasonic cutter, a laser cutter or the like may be used as cutting means.

The whole process of stacking the upper sheet 2Y on the lower sheet 2X is thus executed, and this process is repeated to stack and glue the sheets 2 one after another. The effective area and the waste area of the sheet 2 to be stacked on top of the lamination T is corrected, each time it is stacked, on the basis of the lamination height of the sheet 2Y detected by the detector. Specifically, in the case that the detected lamination height is different from the estimated one, the three-dimensional object is sliced at a slice position (height) obtained on the basis of the detected lamination height in order to obtain the sectional configuration at the detected height.

Further, the table 14 is moved downwardly by the height of the stacked sheet 2Y and the adhesive layers 6 and 8 to wait the supply of the next sheet 2.

By repeating the above-mentioned processes, as shown in FIG. 1, the sheets 2 are stacked on the table 14 while forming the three-dimensional object M within the lamination T on the table 14.

Then, as shown in FIGS. 5(D) and 5(E), after all of the sheets 2 have been stacked and glued together, the lamination T is taken from the table 14 and the laminated waste area U is removed along the dividing lines 50.

The flat parts of the waste area U may be removed in block and the fairly rugged parts thereof may be removed by separating the sheets 2 one by one.

Figure 5F:
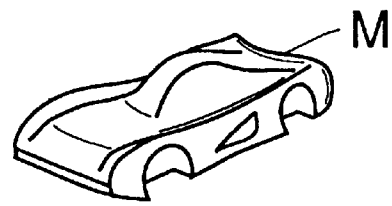
FIG. 5(F) is a view showing the model M thus fabricated.

As shown in FIG. 5(F), the model M which appears by removing the entire waste area U has a shape similar to a three-dimensional shape of a car model C designed by the three-dimension CAD system.

The stacked and glued sheets 2 are not readily separated on the outer surface of the model M since the sheets 2 are reliably glued together on the overlapping area D therebetween by the adhesive 4 of the effective adhesive layer 6.

Further, unlike the case of using a photo-solidifying resin, the model M can obtain a sufficient bonding strength without being heated for a certain period of time after lamination, so that the model M is made available immediately after fabrication.

In this embodiment, the heater plate section 30 is used as pressing means, but pressing means which only performs application of pressure may be used together with an adhesive which displays adhesiveness by pressurization.

Further, in this embodiment, the adhesive 4 is interposed between the sheets 2, but the adhesive 4 may be impregnated into the lower and upper sheets 2 with pressure so that the lower and upper sheets 2 with the adhesive 4 impregnated thereinto are directly joined together to form a joined layer without having the adhesive layers 6 and 8 interposed between the lower and upper sheets 2. In this case, the adhesive 4 is not interposed, so that it is possible to reduce the amount of use of the adhesive 4 and to fabricate a firmly joined three-dimensional object M.

Further, in this embodiment, plain paper is used as sheets 2, but it is not limitative. However, plain paper is effective to reduce the running costs, and it can easily be impregnated with the adhesive 4 since it is made of pulp, and it has sufficient heat resistance against hot pressing.

In this embodiment, the invention has been described in relation to the case of fabrication of a car model, but it is not limitative. It is possible to fabricate models or prototypes of any objects, or the products themselves.

Further, in this embodiment, the invention has been described in relation to the case where the sheets are bonded together by hot pressing, but the invention is similarly applied to the case where an adhesive which displays adhesiveness only by application of pressure is used.

Second Embodiment

A second embodiment will now be described with reference to FIGS. 9(A) to 9(E), 10, 11(A) and 11(B).

In the sheet lamination modeling method of this embodiment, like the first embodiment, the processes of defining a three-dimensional shape, defining an effective adhesion area and an auxiliary adhesion area, stacking sheets, and removing a waste area are performed.

FIGS. 9(A) to 9(E) are sectional views of the sheets, showing the sheet stacking and joining process in sequence.

In this embodiment, the same apparatus as in the first embodiment is used. Sheets 102 and an adhesive 104 are also the same ones as in the first embodiment.

The three-dimensional shape defining process of this embodiment is performed in the same way as in the first embodiment.

Now, a sheet 102X and a sheet 102Y to be stacked at a predetermined height position will be described.

The effective area defining process for each section of this embodiment is performed substantially in the same way as in the first embodiment, but is only different in the following point.

Specifically, the pattern within the range of the effective adhesion area E on the CAD system is determined such that the adhesive 104 is completely impregnated into the both sheets 102X and 102Y.

Next, the stacking and joining process of the sheet 102Y will be explained.

The process in which the effective adhesion area E and the auxiliary adhesion area H on the CAD system are formed as an effective adhesive layer 106 and an auxiliary adhesive layer (not shown), respectively, on the sheet 102Y, is the same with the first embodiment.

Here, it should be noted that the lamination T has already been formed on a table with the sheet 102X stacked and joined on the top thereof.

As shown in FIGS. 9(A) to 9(C), in the same way as the first embodiment, the upper sheet 102Y is quickly conveyed to the table section 12 by the conveying section including a rubber roll and is stacked on the lower sheet 102X which has been cut into the effective area V101 and the waste area U101 and has been stacked in layer. The upper sheet 102Y which has been inverted during conveyance is placed such that the adhesive layer 106 and the other adhesive layer are brought into contact with the surface of the lower sheet 102X. In this embodiment, the sheet 102Y is conveyed from the transferring section to the table section 12 within a very short time, thus preventing distortion of the sheet 102Y which may be caused by moisture absorption.

Then, the table 14 is raised and the lamination T is pressed under a predetermined pressure toward the lower surface of the plate 32 which is disposed above the table 14 and which is heated to a predetermined temperature. In this embodiment, the plate 32 is heated to 180 to 200° C. and about one ton of pressure is applied thereon.

As a result, the adhesive 104 interposed between the lower sheet 102X and the upper sheet 102Y is melted and impregnated sufficiently into both of the lower sheet 102X and the upper sheet 102Y under high pressure, so that the sheets 102X and 102Y are tightly joined together.

Figure 10:
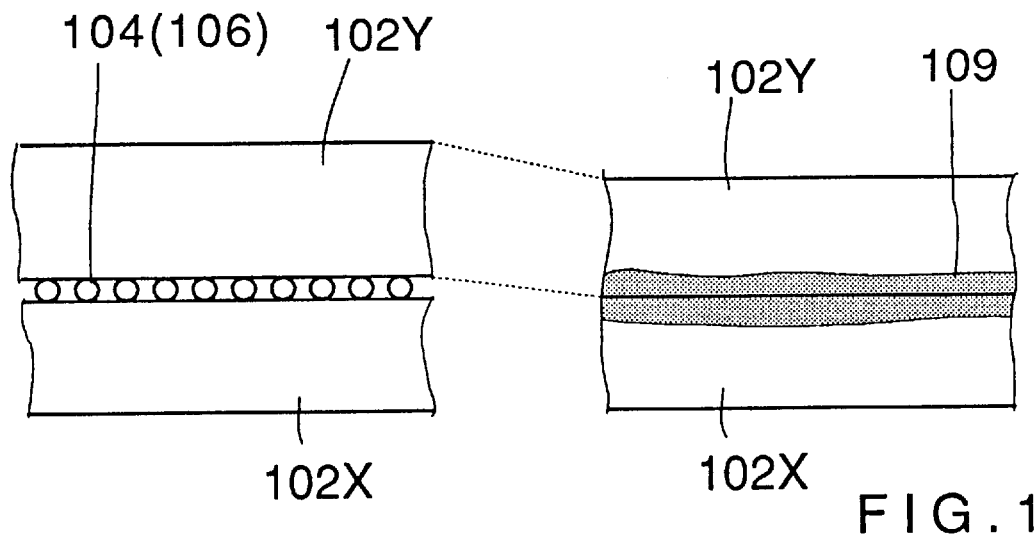
FIG. 10 illustrate a state where a joined layer is formed from the sheets joined together during pressurization.

In other words, as shown in FIGS. 9(D) and 10, the upper portion (about one quarter of the thickness from the top) of the lower sheet 102X and the lower portion (about one quarter of the thickness from the bottom) of the upper sheet 102Y with the adhesive 104 impregnated thereinto form a joined layer 109 in one continuous piece together with the impregnated adhesive 104. On the joined surface of the sheets 102X and 102Y, the adhesive 104 is impregnated into fibers of the sheets 102X and 102Y which are tangled with each other.

Further, the entire surface of the sheet 102Y is pressed flatly at one time by the plate 32, so that the whole joined layer 109 is formed flatly.

Thus, in the pressurized state which can prevent generation of distortion of the sheet 102Y to eliminate its warping or like defects as much as possible, the adhesive 104 is fluidified and impregnated into the sheets 102X and 102Y under high pressure to form the flat joined layer 109 in part of the sheets 102X and 102Y, so that the sheet 102Y is stacked and joined flatly. Further, the adhesive 104 of the joined layer 109, when hardened, acts to restrain warping of the sheet 102Y even if the sheet 102Y has absorbed moisture after stacked in lamination, so that the flatness of the sheet 102Y can be maintained. Therefore, the level of the lamination surface of the sheet 102Y can be made uniform, so that the sheet 2Y can be stacked and glued in strict conformity with the corresponding sliced section of the object on the CAD.

In addition, the effective adhesive layer 106 and the auxiliary adhesive layer are not interposed between the sheets 102X and 102Y with their substantial thickness, so that lamination height can be easily controlled by thus eliminating the thickness of the adhesive layer 106 which may be produced by variations in the amount and position of the application of the adhesive 104.

Further, the sheets 102X and 102Y are directly joined together by application of pressure and impregnation of the adhesive 104, the amount of the adhesive 104 can be reduced as compared with the case of interposing the adhesive 104.

Thereafter, the sheet 102Y is further pressed repeatedly as the sheets 102 are stacked one by one in layer on the sheet 102Y. Therefore, even if the sheet 102Y gradually absorbs moisture with the lapse of time after lamination, warping of the sheet 102Y is suppressed and contraction of the joined layer 109 is also restrained. Further, the joined layer 109 itself serves to restrain the warping of the sheet 102Y.

Further, on the area forming the auxiliary adhesive layer, the adhesive 104 needs to be only temporarily glued to the sheet 102Y.

Even on the parts where the adhesive 104 has been neither applied nor impregnated, the sheets 102 may be bonded together by tar contained in the sheet 102 (paper) and evaporated by heating.

Figure 11A:
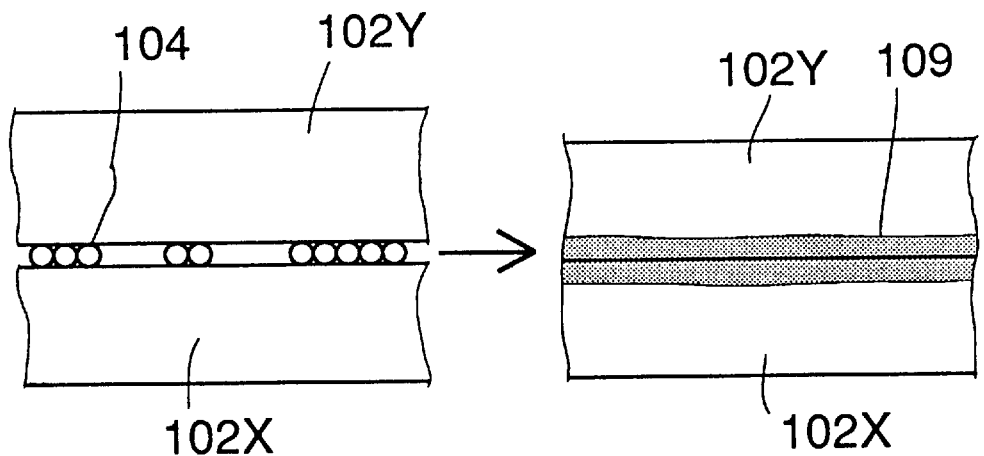
FIG. 11(A) is a sectional view showing a state where the dispersedly transferred adhesive forms an integral joined layer by pressurization, and FIG. 11 (B) is a sectional view showing a state where the unevenly transferred adhesive forms a joined layer having substantially even thickness by pressurization.
Figure 11B:
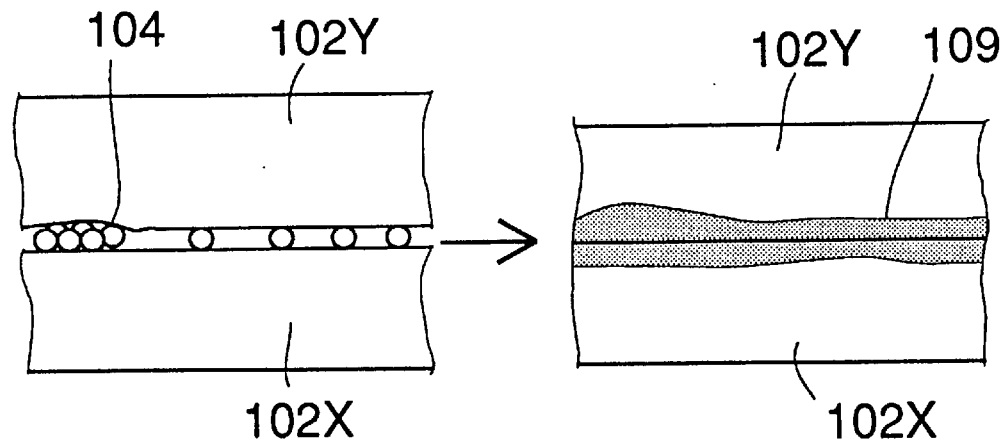

Further, as shown in FIG. 11(A), the adhesive 104 is spread by impregnation even to the portion (the inside of each mesh of the adhesive) of the effective adhesive layer 106 where the adhesive 104 has not been transferred. As shown in FIG. 11(B), the excessive amount of the transferred adhesive 104 is spread to the surrounding and is impregnated in the sheets 102X and 102Y.

The sheet 102Y is pressed in its thickness direction and is contracted in its thickness to the extent depending on the kind of the sheet 102Y (see FIG. 10). Here, the contracted state of the sheet 102Y is maintained by the existence of the joined layer 109, and the sheet 102Y is not lifted after stacked in lamination.

Thereafter, the table 14 is lowered, and the sheet 102Y forming the uppermost layer of the lamination T on the table 14 is, like the first embodiment, cut by the cutter plotter 35 into an effective area V102 and a waste area U102 on the basis of the data from the three-dimension CAD system (see FIG. 9(E)).

In this case, like the first embodiment, the joined waste area U serves as support during cutting operation while in the vicinity of the contour of the joined effective area V, the sheets 2 are joined together by the joined layer 109 formed by the effective adhesive layer 106 and the auxiliary adhesive layer 108, so that any misalignment or separation of the upper sheet 102Y is not caused by the movement of the cutter 35.

Then, like the first embodiment, dividing lines are provided.

Thus, like the first embodiment, the whole process of stacking and joining one sheet 102 on top of the other is executed in sequence. By repeating this process, the model is formed within the lamination T on the table 14 and ultimately, the laminated waste area U is removed.

The model M which appears by removing the whole waste area U has a shape similar to a three-dimensional shape designed by the three-dimension CAD system.

Particularly, in the model M of this embodiment, the adjacent sheets 102 are joined to each other, without having the adhesive layer 106 interposed between the adjacent sheets 102 in lamination, but by means of the joined layer 109 formed by impregnating the adhesive 104 into part of the sheets 102 to be joined to each other. Therefore, a great bonding strength is provided, so that the model M forms a rigidly integrated structure. Further, each joined layer 109 serves as a beam to restrain the warping of the sheets 2, so that the size variations caused by absorbing moisture are reduced and a high fabrication accuracy can be obtained and maintained in the model M.

In the same processes as in the first embodiment, the same operations as the first embodiment are performed in this embodiment.

Third Embodiment

Figure 12:
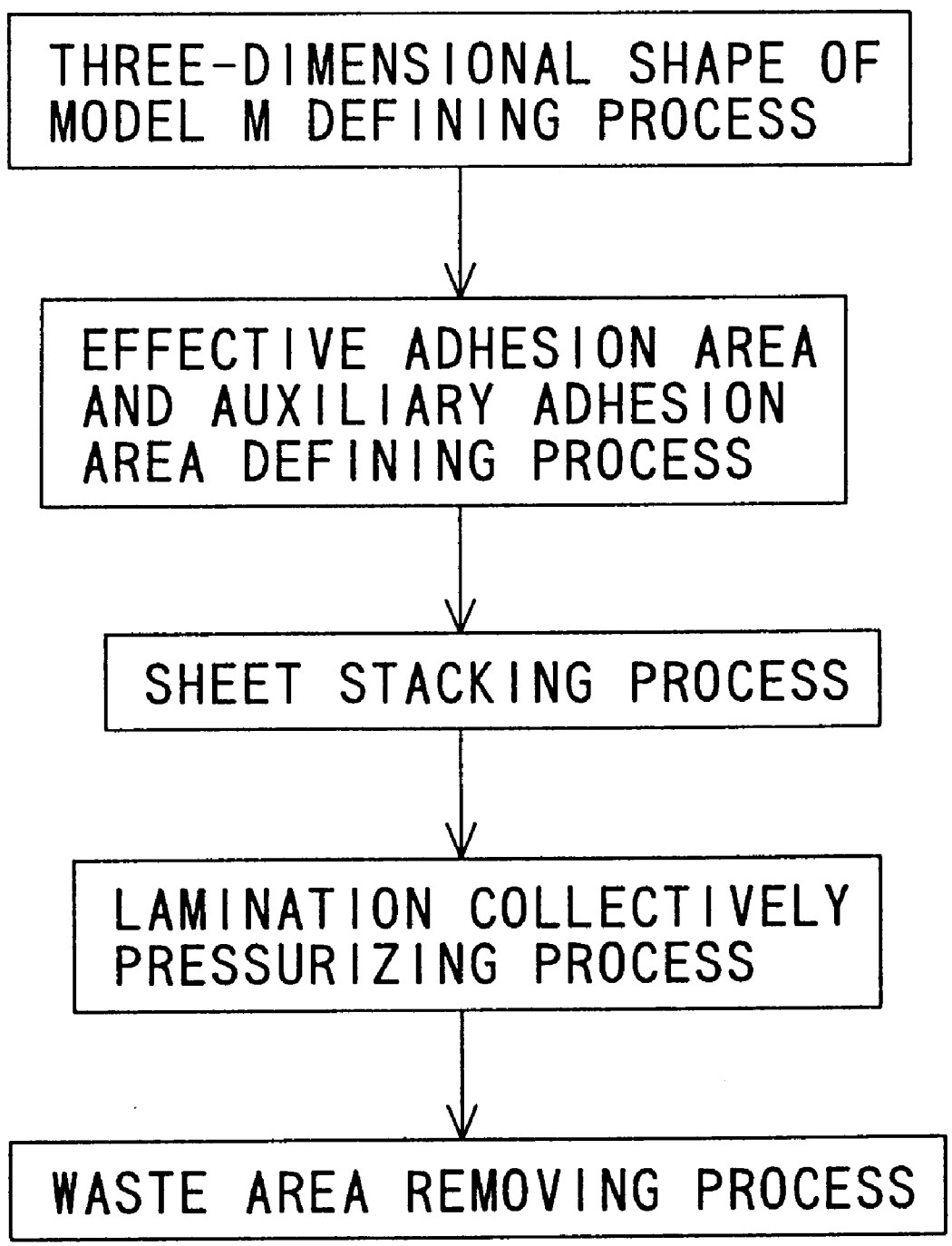
FIG. 12 is a block diagram showing the operation according to a third embodiment.

A third embodiment will now be described with reference to FIG. 12.

This embodiment comprises processes of defining a three-dimensional shape, defining an effective adhesion area and an auxiliary adhesion area on each section, stacking sheets, collectively pressurizing a lamination, and removing a waste area.

In this embodiment, unless otherwise specified, the lamination modeling apparatus, sheets and an adhesive in use are the same as the first embodiment.

The processes of defining a three-dimensional shape, defining each area, and stacking sheets are performed in the same way as the first embodiment.

In this embodiment, a collective pressurizing process is added after the stacking process.

The collective pressurizing process is provided to form the model M without warp by correcting any warp which has been produced during the stacking process in the finished lamination T and by restraining any warp which is being generated on the upper portion of the lamination T.

To this end, the lamination T is pressed onto the plate 32 by raising the table 14 for pressurization under pressure sufficient to restrain such warp, until the adhesive 4 is cooled down to temperatures at which it is completely hardened.

As a result, any warp on the lower portion of the lamination T is corrected and accordingly, the warp on the lower portion is not magnified on the upper portion, so that the warp of the lamination T is effectively reduced.

In this case, the effect by pressurization can be effectively obtained by placing the lamination T under the condition in which it is allowed to be gradually cooled from the state after completion of heating.

Fourth Embodiment

Figure 13:
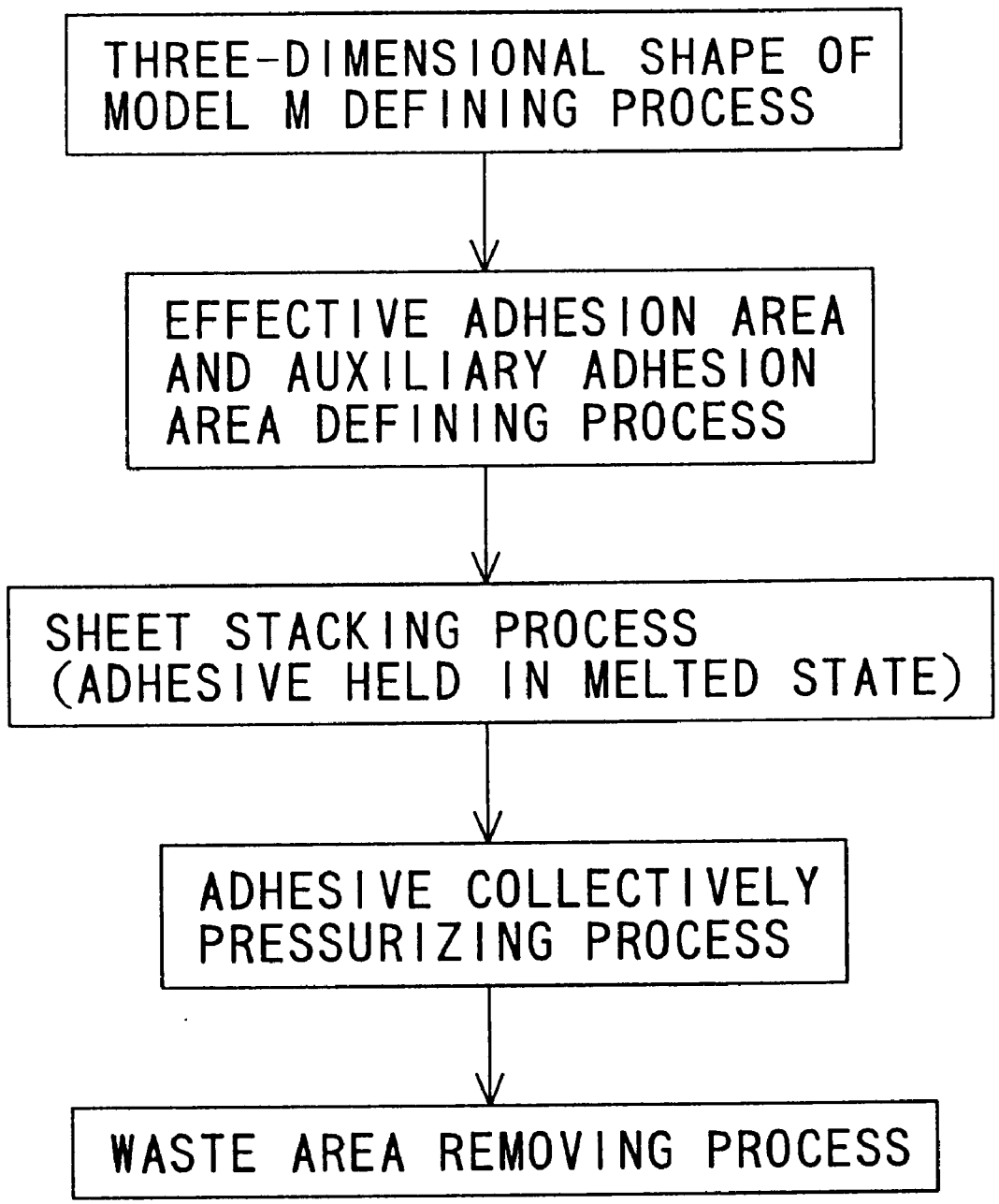
FIG. 13 is a block diagram showing the operation according to a fourth embodiment.

A fourth embodiment will now be described with reference to FIGS. 13 and 14.

In the sheet lamination modeling method of this embodiment, the following processes are performed. FIG. 13 is a block diagram showing the operation of this embodiment.

This embodiment comprises processes of defining a three-dimensional shape, defining an effective adhesion area and an auxiliary adhesion area on each section, stacking sheets, collectively hardening an adhesive, and removing a waste area.

The lamination modeling apparatus in this embodiment is substantially the same as the first embodiment, except in the following points.

Figure 14:
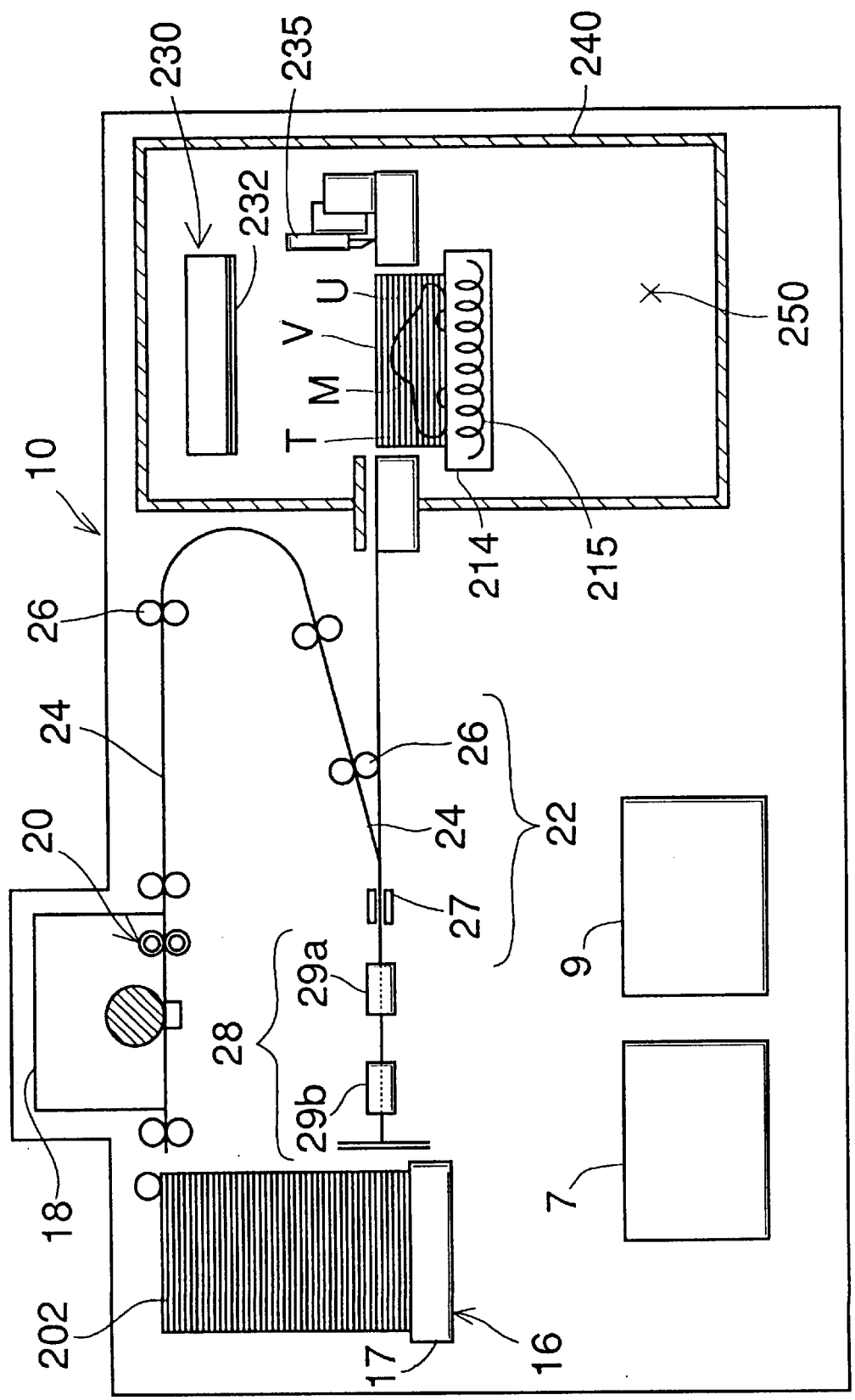
FIG. 14 is a schematic view showing a sheet lamination modeling apparatus in the fourth embodiment.

In the apparatus of this embodiment, as shown in FIG. 14, a heater 215 is incorporated in a vertically movable table 214 on which sheets 202 are placed, and the heater 215 serves to heat the lamination T on the table 214 during stacking operation. Further, a wall 240 made of heat insulating material is provided to surround the whole section including the table 214 and a plate 232, and thus a lamination chamber 250 where the lamination T can be kept warm is provided.

The heater 215 of the table 214, combined with the adiabatic efficiency of the wall 240, is designed to heat the lamination T to be fabricated such that the adhesive 204 interposed between the sheets 202 of the lamination T can be maintained in a melted state and also to heat the finished lamination T such that the adhesive 204 interposed all through the finished lamination T can be brought into a melted state.

Therefore, the extent of heating by the heater 215 depends on the thickness, size or shape of the lamination T, and on the heat retaining property of the sheets 202 and the kinds of the adhesive 204.

The wall 240 is provided to prevent dissipation of the heat which is supplied from the table 214 so that the heat can be efficiently absorbed into the lamination T, and thus to maintain the lamination T in a uniform temperature condition.

The heat from the plate 232 can also be efficiently maintained in the lamination T by the wall 240.

Therefore, the heating efficiency of the plate 232 is improved and accordingly, the heating cost can be reduced.

The sheets 202 and the adhesive 204 used in this embodiment are the same as the first embodiment, unless otherwise specified.

Next, each process of this embodiment will be explained in order.

The three-dimensional shape defining process and the each area defining process are the same as the first embodiment.

The sheet stacking process of this embodiment is different from that of the first embodiment, only in that it is performed in the state where the table 214 is heated and the lamination T on the table 214 is surrounded by the heat insulating wall 240.

The table 214 is heated to the extent that the adhesive 204 in the lamination T which is being formed in the lamination chamber 250 can be maintained in a melted state.

Therefore, in this embodiment, unlike the first embodiment, the adhesive 204 is interposed between the sheets 202 in a melted state during the stacking operation, and it further exists in the lamination T as being held in the melted state even after heating and pressing operation by the plate 232.

This means that during the stacking process, there is no possibility of contraction of the adhesive 204 which may be caused when cooled and solidified, and thus, any warp of the lamination T which may be generated by such contraction can be eliminated.

Further, a uniform temperature is kept all through the lamination T during the stacking process, so that the first sheet 202 which has been stacked immediately after the start of the stacking operation and the last sheet 202 which has been stacked are maintained substantially in the same temperature condition.

Further, at the same time, the melted state of the adhesive 204 which lasts longer than in the first embodiment much more enhances the impregnation of the adhesive 204 into the sheets 202.

In this case, there is also no possibility of misalignment in the stacking position or like defects, since the sheets 202 are maintained joined firmly to each other by pressing and through the melted adhesive 204. Also, the misalignment of the sheets 202 is not caused during the cutting operation by the cutter 235.

Further, like the first embodiment, the warp of the sheets 202 generated by pressing every time one sheet is stacked on the other can be corrected.

Thus, the sheets 202 are stacked one on the other in sequence until the last sheet 202 is stacked to complete the lamination T.

In the lamination T with the last sheet 202 stacked thereon, the adhesive 204 interposed through the sheets 202 is in a melted state.

In the next process of hardening the adhesive collectively, the whole lamination T with the adhesive 204 in a melted state is pressed and gradually cooled in the lamination chamber 250, in order to collectively harden the adhesive 204 in the lamination T.

At this time, the lamination T on the table 214 which is disposed in the lower part of the lamination chamber 250 is pressed onto the plate 232 which is disposed above, by raising the table 214, so that the lamination T is held in a pressurized state.

In this pressurized state, heating by the heater of the plate 232 and the heater 215 of the table 214 is stopped, so that the lamination T is gradually allowed to be cooled.

Thus, the adhesive 204 interposed in the lamination T, in the state where the contraction is restrained with pressure, is hardened simultaneously almost in an even pace as a whole to bond the sheets 202 together.

In other words, according to this embodiment, where the stacking process is separated from the hardening process of the adhesive 204, in the stacking process, generation of warps which may be caused by contraction of the adhesive 204 between the sheets is eliminated by maintaining the melted state of the adhesive 204, and in the hardening process, the contraction of the adhesive 204 is restrained by continuing pressurization until the adhesive 204 is hardened while forming the condition that the temperature is uniformly lowered.

As a result, it is possible to eliminate any warp in the lamination T so as to obtain a three-dimensional object (model M) with high accuracy.

Further, the sufficient impregnation of the adhesive 204 by pressurization in the melted state increases the bonding strength, so that a three-dimensional object with greater strength can be obtained.

In this embodiment, the heater 215 is particularly provided in the table 214 to maintain the melted state of the adhesive 204 in the stacking process, but, depending on the heat retaining property of the sheets 202, temperature or like properties of the adhesive 204, thickness of the lamination T, or the like conditions, it may be designed such that the adhesive 204 is maintained in a melted state by means of the wall 240 and the plate 232 without heating by the heater 215.

In the same processes as in the first embodiment, the same operations as the first embodiment are performed in this embodiment.

Fifth Embodiment

A fifth embodiment will now be described with reference to FIG. 15.

This embodiment comprises processes of defining a three-dimensional shape, defining an effective adhesion area and an auxiliary adhesion area on each section, stacking and gluing sheets, collectively melting and collectively hardening adhesive, and removing a waste area.

In this embodiment, unless otherwise specified, the lamination modeling apparatus, sheets and an adhesive in use are the same as the fourth embodiment.

Figure 15:
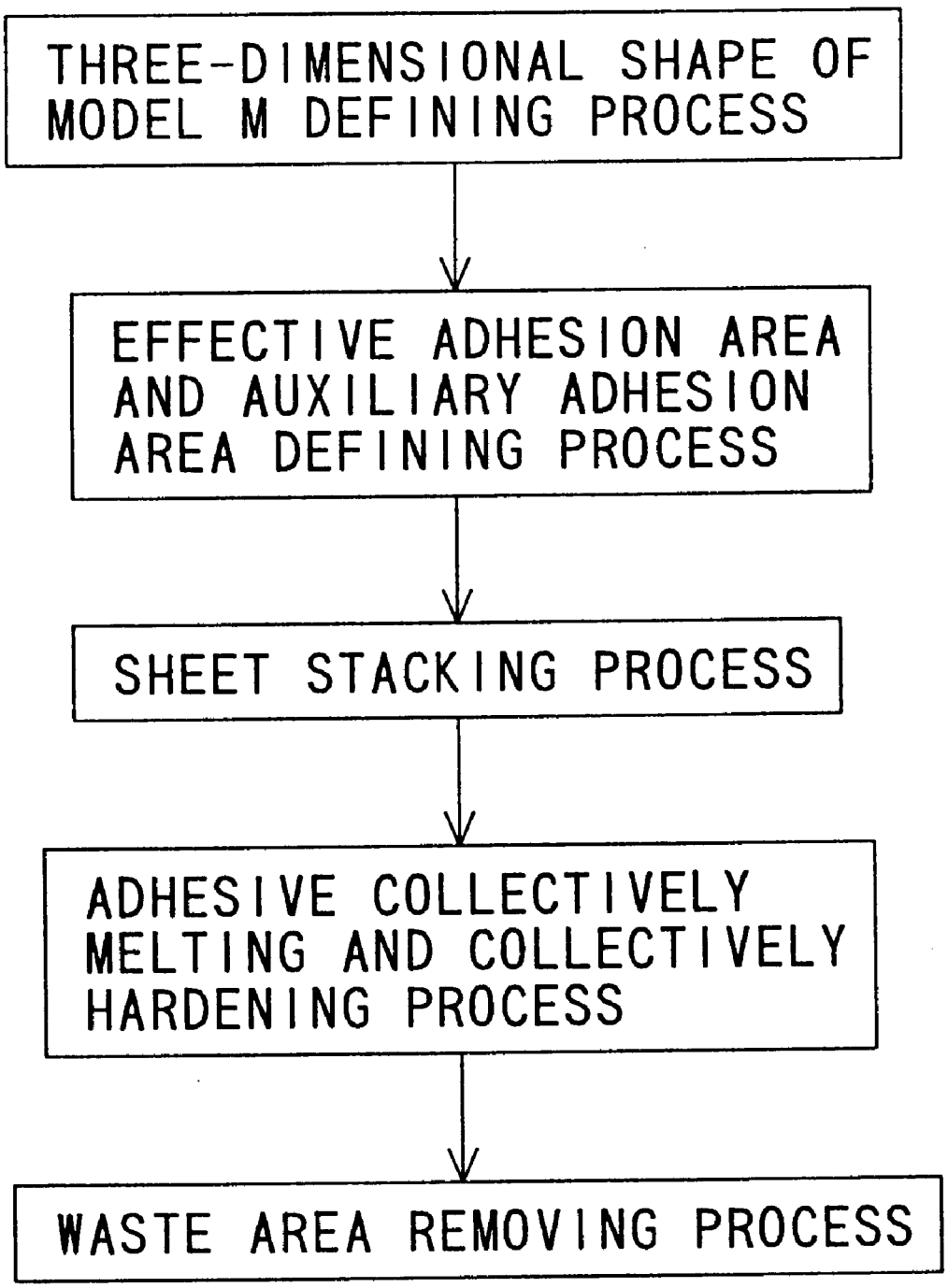
FIG. 15 is a block diagram showing the operation according to a fifth embodiment.

FIG. 15 is a block diagram showing the operation of this embodiment.

The three-dimensional shape defining process and the each area defining process are performed in the same way as the first embodiment.

The sheet stacking and gluing process of this embodiment is different from that of the fourth embodiment only in that the table 214 is not heated.

Therefore, unlike the fourth embodiment, all of the adhesive 204 is not maintained in a melted state in the stacking process. In other words, the adhesive 204 between the sheets 202 which were stacked in the final step of the process is still in the melted state, while the adhesive 204 between the sheets 202 which were stacked just after the start of the process for the lowest layer of the lamination T has already been solidified to bond the sheets 202 together almost completely.

In the next process of collectively melting and collectively hardening the adhesive, in the lamination chamber 250 which is surrounded by the heat insulating wall 240, the table 214 is heated while the plate is heated as well, and in this state, the lamination T is pressed.

By heating the table 214 and the plate 232 to a predetermined temperature and with the heat insulating wall 240, the whole lamination T is uniformly heated and thus, the adhesive 204 in the lamination T is brought into a melted state again.

After keeping this state for a certain period of time so that the whole lamination T is uniformly heated and the adhesive 204 is brought into a uniform melted state, heating of the table 214 and the plate 232 is stopped to allow the lamination T to be gradually cooled in the lamination chamber 250, while the pressing of the lamination T is continued in this state.

Thus, the adhesive 204 in the lamination T is slowly cooled and hardened in the formed state by pressing.

When the lamination T is completely cooled and the adhesive 204 is hardened, the pressing is stopped and the lamination T is taken out.

As a result, a three-dimensional object (model M) having high accuracy in which the generation of warps by contraction of the adhesive 204 is restrained, can be obtained.

In this embodiment, in the stacking process, the adhesive 204 is hardened to bond the sheets 202 together, but, after completion of the stacking process, all of the adhesive is collectively melted and hardened. Consequently, as a whole, the hardening and gluing process and the stacking process are separately performed. Thus, the warping of the adhesive 204 and the sheets 202 in the stacking process and the similar warping in the hardening process as well can be eliminated.

In this embodiment, the plate 232 is heated in the stacking process like the first embodiment, but in the case where a pressing pressure high enough to pressure bond the sheets 202 is obtained, or in the case where adhesive which is melted by pressing is used, the plate 232 need not be heated.

Therefore, in the stacking process, solely the pressing operation may be performed without heating, and in the hardening process, it may be heated for the first time. However, in the case of a resin which melts with pressure, heating is not required at any stage, but it is effective in improving the fluidity of the adhesive 204 so as to permit efficient impregnation into the sheets 202.

In the fourth and fifth embodiments, collective hardening is performed by pressing with the adhesive 204 kept in the melted state, but it is not limitative.

For example, depending on the size of the lamination T or the material of the sheets 202, the adhesive 204 is kept in the melted state until completion of stacking, or the adhesive 204 is brought into a uniform, melted state again after completion of stacking, and then the adhesive 204 is allowed to be gradually cooled in the lamination chamber 250 without pressing so that the generation of warps by contraction can be prevented. Particularly in this case, the adhesive 204 interposed between the sheets in the lamination is hardened simultaneously almost in an even pace. Thus, it is possible to reliably eliminate the occurrence that warps generated from the lower portion of the lamination are accumulated as the lamination is gradually hardened from the lower portion thereof and are amplified on the upper portion of the lamination.

What is claimed is:

1. A method of forming a three-dimensional object by stacking and gluing sheets together, comprising the steps of providing a lower sheet cut into an effective area constituting the three-dimensional object and a waste area not constituting the three-dimensional object, providing an upper sheet to be stacked on top of said lower sheet, said upper sheet having an effective area constituting the three-dimensional object and a waste area not constituting the three-dimensional object, supplying an adhesive between said lower sheet and said upper sheet and onto an area which extends by a predetermined width outwardly of an overlapping area covering both said effective area of said upper sheet and said effective area of said lower sheet by an amount sufficient to prevent unglued areas from causing minor errors in stacking, thereby forming an effective adhesive layer, gluing said lower sheet and said upper sheet together, and cutting said upper sheet into the effective area and the waste area.

2. The method as defined in claim 1, comprising the additional step of forming an auxiliary adhesive layer by supplying the adhesive less densely than said effective adhesive layer, onto the outside of the effective adhesive layer.

3. The method as defined in claim 1, wherein said adhesive is applied by electrostatic transfer.

4. The method as defined in claim 1, wherein said upper sheet and said lower sheet are glued together under pressure.

5. A method as defined in claim 1, wherein the adhesive extends about 0.5 mm outwardly from the overlapping area covering both said effective area of said upper sheet and said effective area of said lower sheet.

6. A method of forming a three-dimensional object comprising the steps of:
   (a) cutting a first sheet into a three-dimensional object effective area and a waste area that will not be part of the three-dimensional object;
   (b) disposing an adhesive between the first sheet and a second sheet;
   (c) stacking the second sheet on top of the first sheet, comprising the steps of lowering a table having the first sheet disposed thereupon, placing the second sheet on top of the first sheet and raising the table;
   (d) adhering the first sheet and the second sheet together under pressure and heat;
   (e) cutting the second sheet into a three-dimensional object effective area and a waste area that will not be part of the three-dimensional object;
   (f) repeating steps (a) to (e) to form a sheet lamination block; and
   (g) pressing the sheet lamination block without heat until the adhesive disposed within the sheet lamination block has cooled.

7. A method as in claim 5 wherein steps, (a) and (e) are performed using a knife.

8. A method as in claim 6, wherein step (d) comprises pressing and heating the entire surface of the second sheet.

9. A method as in claim 6, wherein step (b) is performed by electrostatic transfer.

10. A method as in claim 6, wherein steps (a) and (e) are performed using a knife, and wherein step (d) comprises pressing and heating the entire surface of the second sheet.

11. A method of forming a three-dimensional object comprising the steps of:

cutting a first sheet into a three-dimensional object effective area and a waste area that will not be part of the three-dimensional object;

supplying an adhesive between the first sheet and a second sheet, the adhesive being spread about an area that extends by a predetermined width beyond an overlapping area that covers both the three-dimensional object effective area of the first sheet and a three-dimensional objective effective area of the second sheet;

stacking the second sheet on top of the first sheet;

adhering the three-dimensional objective effective areas of the first sheet and the second sheet and a portion of waste areas of the first sheet and the second sheet that is proximal to the three-dimensional objective effective areas of the first sheet and the second sheet; and cutting the second sheet into the three-dimensional objective effective area and the waste area that will not be part of the three-dimensional object.

12. A method as in claim 11, wherein the cutting steps are performed using a knife.

13. A method as in claim 11, wherein the stacking step comprises the steps of:

lowering a table having the first sheet disposed thereupon;

placing the second sheet on top of the first sheet; and raising the table.

14. A method as in claim 11, wherein the adhering step comprises pressing and heating the entire surface of the second sheet.

15. A method as in claim 11, wherein the supplying step is performed by electrostatic transfer.

16. A method as in claim 11, wherein the cutting steps are performed using a knife, wherein stacking step comprises the steps of lowering a table having the first sheet disposed thereupon, placing the second sheet on top of the first sheet and raising the table and wherein the adhering step comprises pressing and heating the entire surface of the second sheet.

17. A method as in claim 11, wherein the adhesive extends about 0.5 mm outwardly from the overlapping area covering both said effective area of said upper sheet and said effective area of said lower sheet.

* * * * *